United States Patent

Motoi et al.

[11] Patent Number: 5,436,644
[45] Date of Patent: Jul. 25, 1995

[54] IMAGE FORMING METHOD

[75] Inventors: Toshihiro Motoi; Satoshi Haneda, both of Hachioji, Japan

[73] Assignee: Konica Corporation, Tokyo, Japan

[21] Appl. No.: 938,461

[22] Filed: Aug. 28, 1992

[30] Foreign Application Priority Data

| Sep. 18, 1991 | [JP] | Japan | 3-238160 |
| Sep. 20, 1991 | [JP] | Japan | 3-241491 |
| Oct. 1, 1991 | [JP] | Japan | 3-253704 |
| Dec. 26, 1991 | [JP] | Japan | 3-345205 |
| Dec. 26, 1991 | [JP] | Japan | 3-345206 |
| Jul. 1, 1992 | [JP] | Japan | 4-000844 |
| Jul. 1, 1992 | [JP] | Japan | 4-000845 |

[51] Int. Cl.$^6$ ............................................. B41J 2/435
[52] U.S. Cl. ............................................. 347/256
[58] Field of Search ............ 346/1.1, 108, 107 R, 346/76 L, 160; 358/296, 298, 300, 302

[56] References Cited

U.S. PATENT DOCUMENTS

| 4,383,262 | 5/1983 | Noguchi . | |
| 5,017,944 | 5/1991 | Kitamura et al. | 346/108 |
| 5,029,108 | 7/1991 | Lung . | |
| 5,081,528 | 1/1992 | Hayashi et al. | 358/456 |
| 5,144,337 | 9/1992 | Imamura et al. . | |
| 5,170,261 | 12/1992 | Cargill et al. | 358/298 |
| 5,255,014 | 10/1993 | Haneda et al. | 346/108 |

FOREIGN PATENT DOCUMENTS

| 0415648A3 | 3/1991 | European Pat. Off. . |
| 0426435A3 | 5/1991 | European Pat. Off. . |
| 0451770A3 | 10/1991 | European Pat. Off. . |
| 0465074A1 | 1/1992 | European Pat. Off. . |
| 0527574A1 | 2/1993 | European Pat. Off. . |
| 3111328A1 | 1/1982 | Germany . |

*Primary Examiner*—Mark J. Reinhart
*Attorney, Agent, or Firm*—Frishauf, Holtz, Goodman & Woodward

[57] ABSTRACT

In a method of writing a line of image on a photoreceptor with a laser beam in a main scanning direction, and of shifting in a sub-scanning direction to a next main-scanning line to write a next line of image, the method includes a step of shaping the laser beam spot on the photoreceptor to be in a form of an oval, said oval having a major axis that is in a direction that is in parallel to a main scanning direction of the laser.

13 Claims, 31 Drawing Sheets

FIG. 5
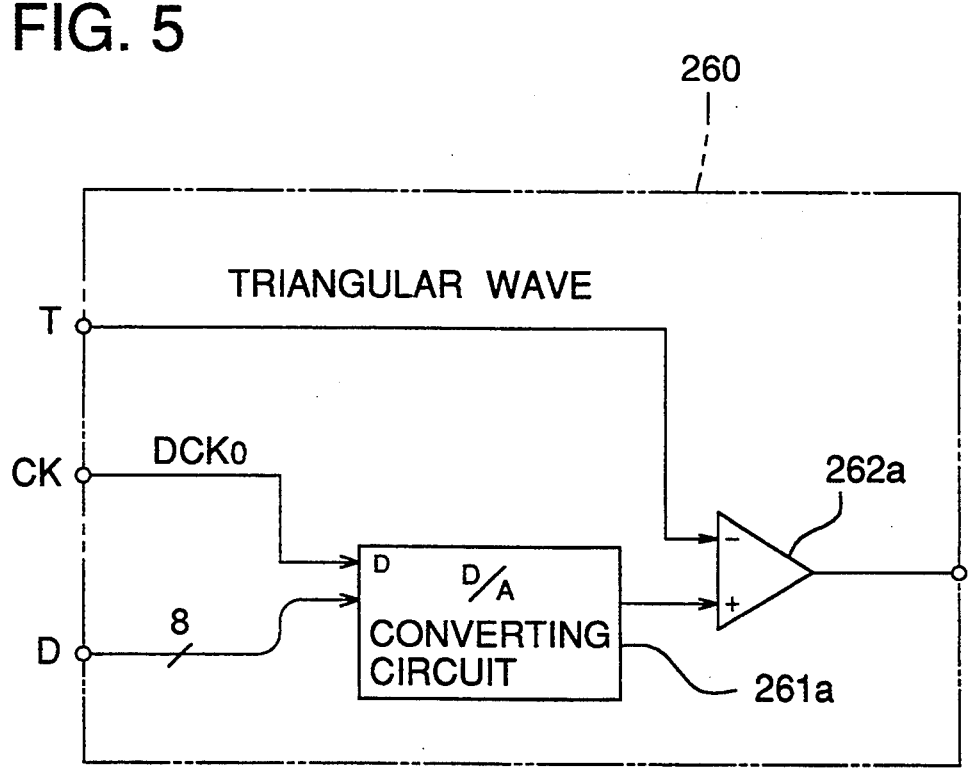
FIG. 6
FIG. 6a
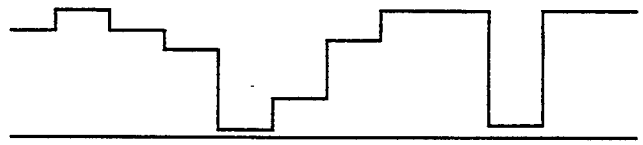
FIG. 6b
FIG. 6c
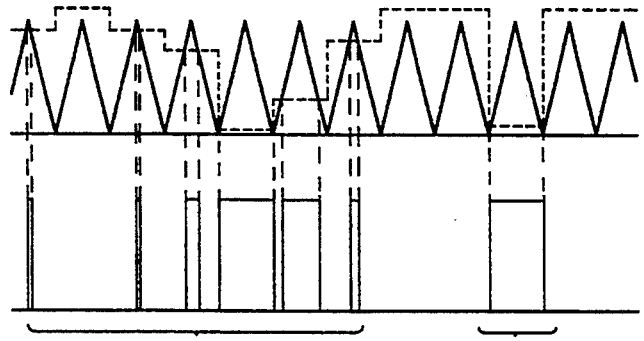

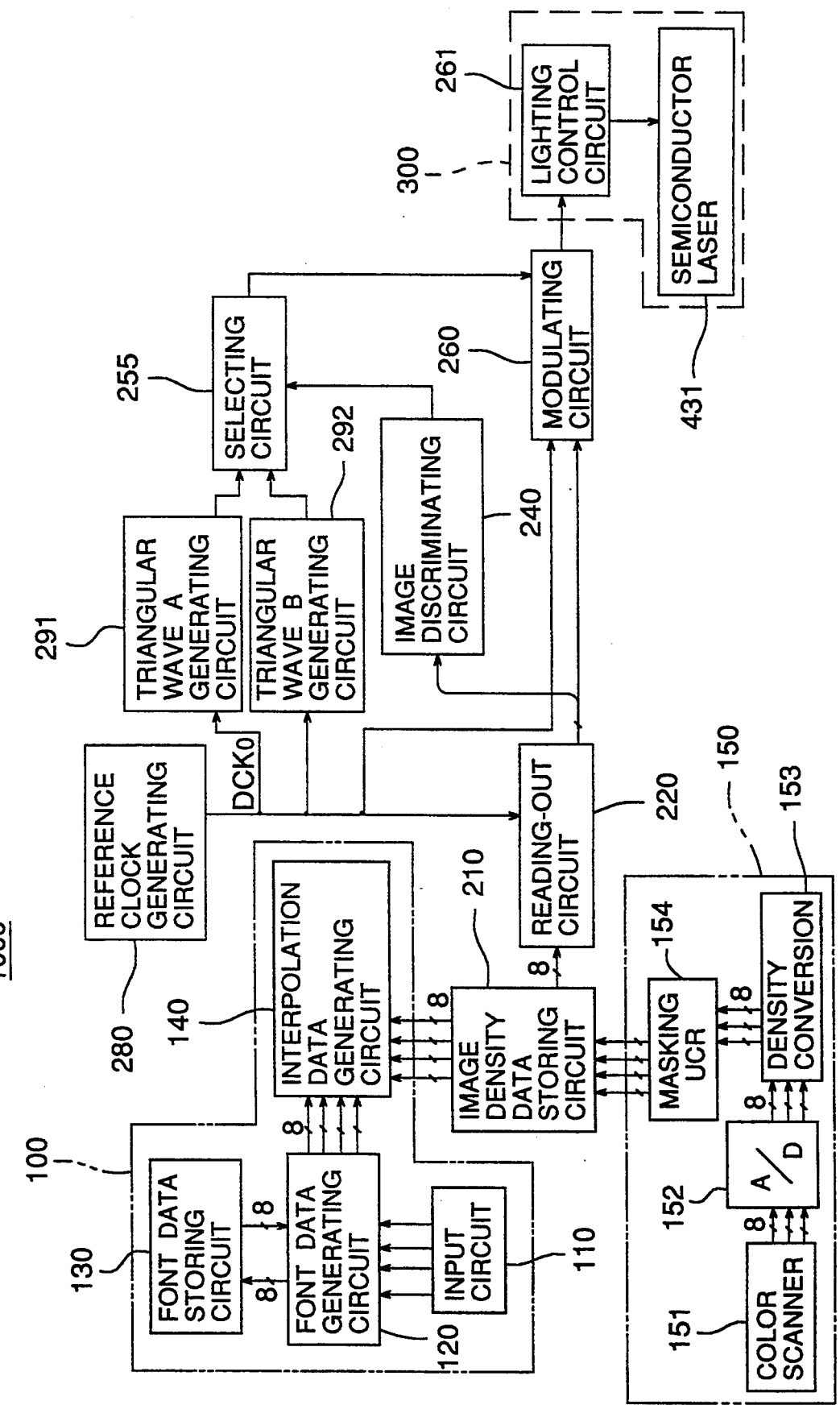

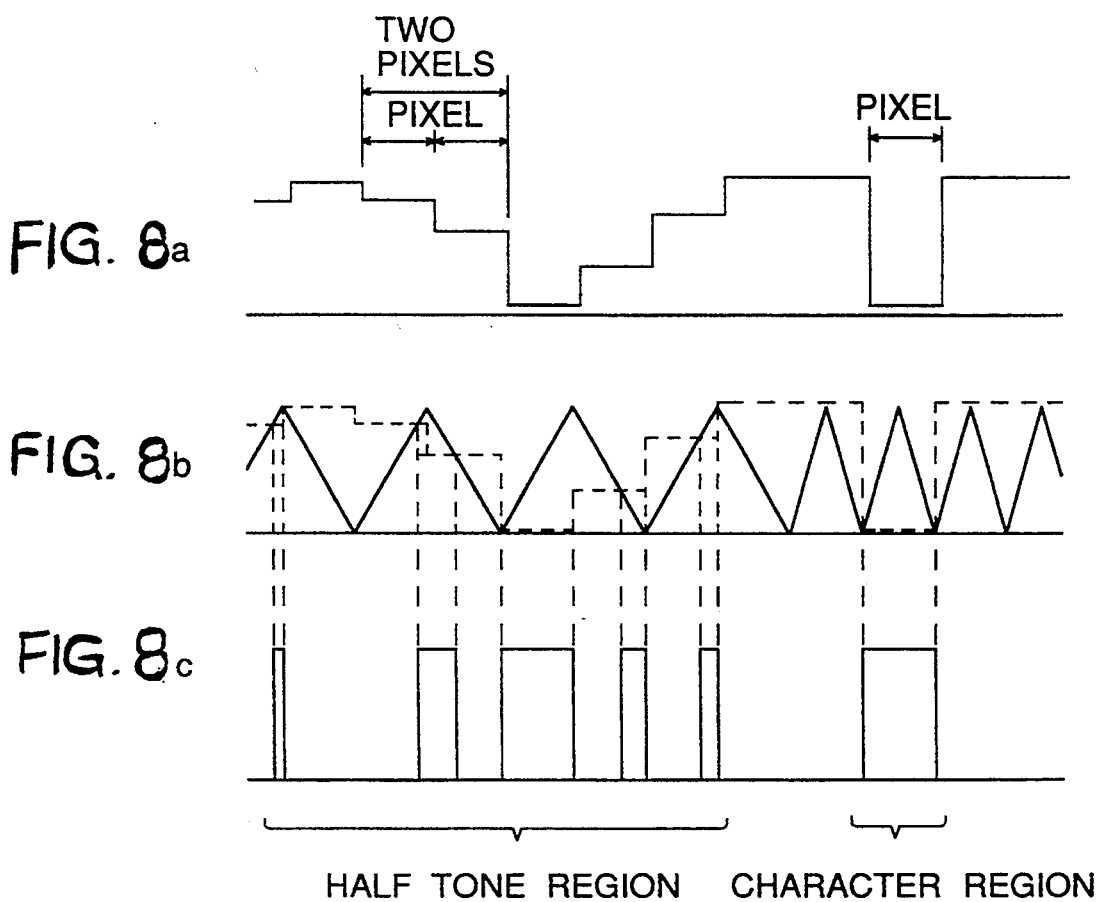

FIG. 14 - A (Prior Art)
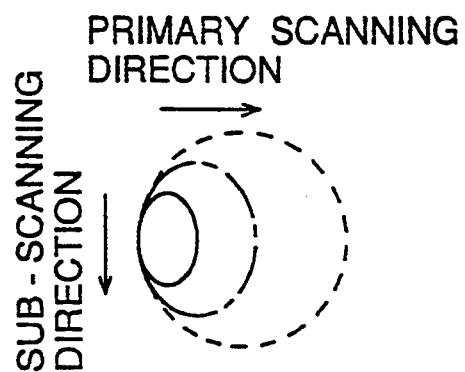
14 - B (Prior Art)
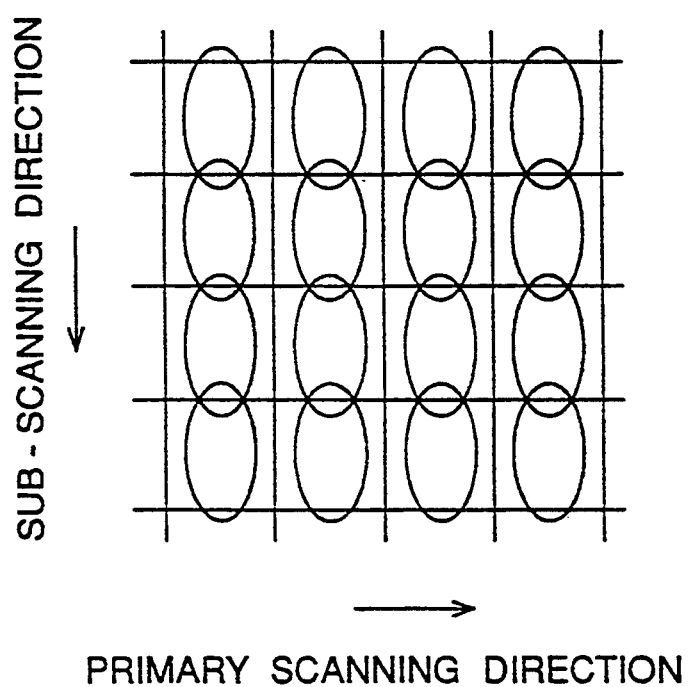

FIG. 16 - A
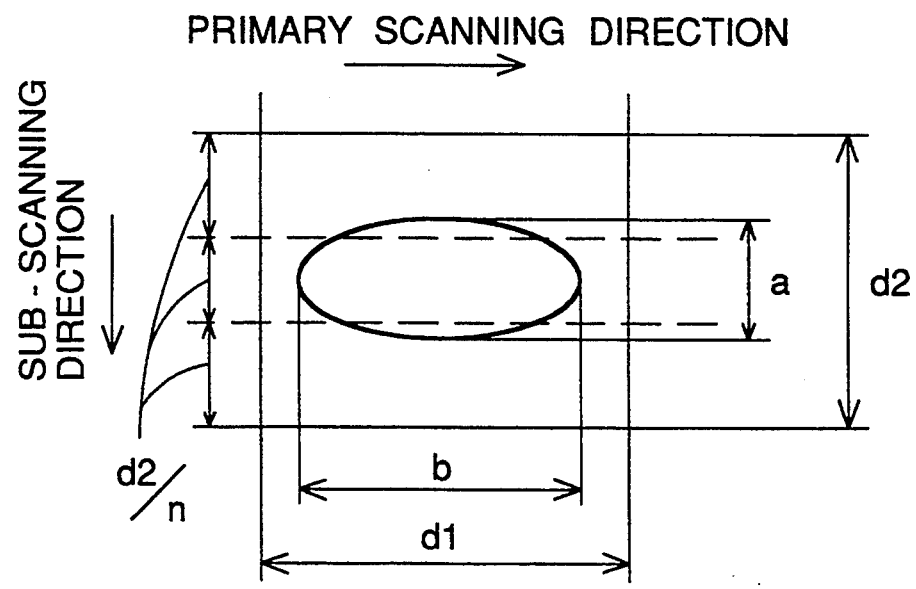
FIG. 16 - B
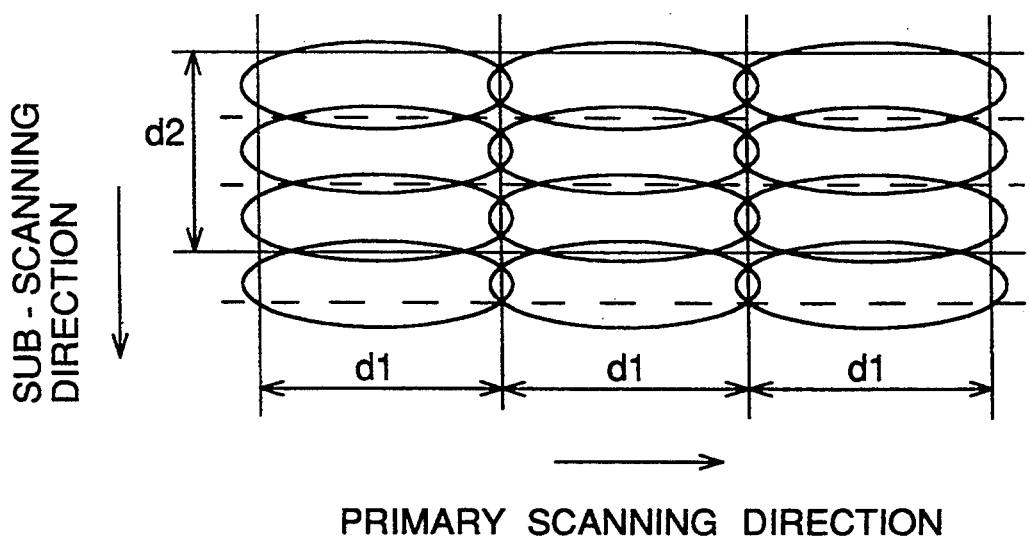

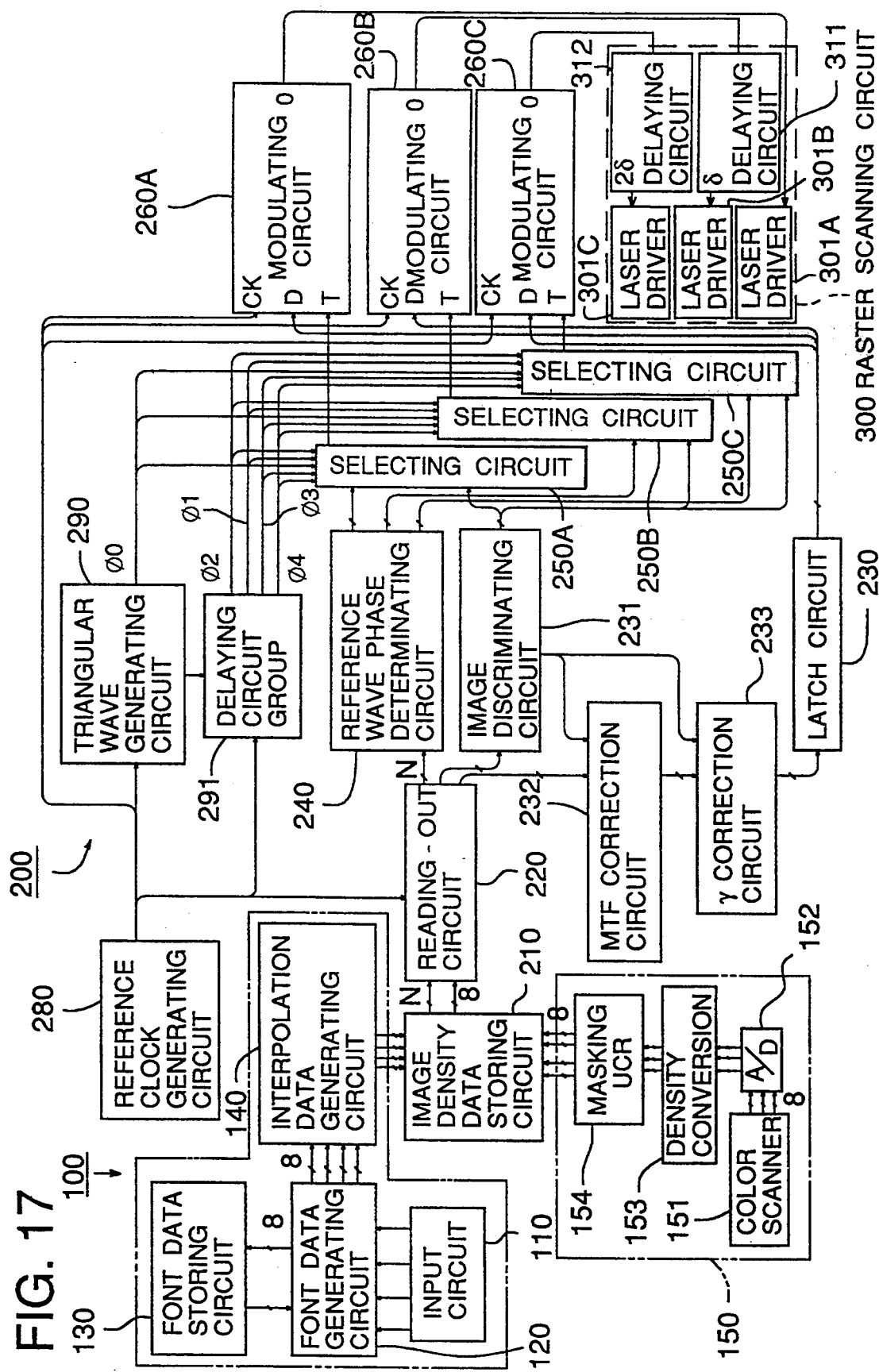

|  |  |  |
|---|---|---|
| m1=226 | m2=251 | m3=8 |
| m4=200 | m5=45 | m6=7 |
| m7=190 | m8=8 | m9=2 | m5

|  |  |  |
|---|---|---|
| S1=71 | S2=76 | S3=24 |
| S4=65 | S5=32 | S6=24 |
| S7=63 | S8=24 | S9=22 |

⁄⁄ : region relating to S1
≡ : region relating to S2
||| : region relating to S3
\\ : region relating to S4 primary scanning direction

IMAGE FORMING METHOD

BACKGROUND OF THE INVENTION

The present invention relates to an image forming method by which images are recorded with a laser scanning optical system.

An image forming method is well known which is characterized in that: the surface of a photoreceptor drum is scanned by a single or a plurality of laser beams, and information according to a recording signal is recorded on the photoreceptor. The following scanning means is applied to the aforementioned image forming method: a laser beam is reflected by a rotating polygonal mirror which is rotated by a motor at constant speed; the reflected beam is transmitted through an fθ lens; and a minute spot is formed on the surface of the photoreceptor so as to be scanned in the form of dot exposure.

The following image forming means is applied to the aforementioned image forming method: the photoreceptor drum is rotated by a motor at constant speed; the shaft of the photoreceptor drum is disposed in parallel with the scanning direction of the laser beam, so that auxiliary scanning is conducted by the rotation of the photoreceptor drum; and due to the aforementioned primary and auxiliary scanning, a latent image is formed on the circumferential surface of the photoreceptor drum which has been uniformly charged.

In the aforementioned image forming method, image quality is determined by a dot diameter of a toner image which is formed when a latent image made by the laser beam is developed.

In order to reproduce a half-tone image the following method is applied:

A pulse width modulation signal is obtained by a comparison circuit from a reference signal of a triangular wave, the period of which is the same as the recording signal of an analog video signal; a semiconductor laser is driven by the aforementioned pulse width signal; a laser beam emitted from the semiconductor is projected in the photoreceptor so that a latent image is formed; and the length of the latent image in the scanning direction is varied according to the aforementioned pulse width, so that a minute rectangular latent image of multi-value can be obtained.

In another image forming method, the distribution of light intensity of a laser beam spot on a photoreceptor drum is approximately the same as a Gaussian curve. Accordingly, when a portion not less than a predetermined threshold value (s) has been developed, electrical potential of toner adhesion us changed. Consequently, when the light intensity of a spot is varied during the process of latent image formation, the diameter of a dot of a toner image (referred to as a toner dot, hereinafter) is also varied. As shown in FIG. 14-A, when the light emitting time is extended, the diameter is increased not only in the primary scanning direction but also in the auxiliary scanning direction.

In this case, a half-tone image is reproduced in the following manner: a modulation signal is obtained which varies in accordance with the density data corresponding to a pixel; a semiconductor laser is driven by this intensity modulation signal; a laser beam emitted from the semiconductor laser, the intensity of the laser beam is varied, is projected on the surface of the photoreceptor drum so that a latent image is formed; and then, the diameter of the latent image dot is varied according to the aforementioned light intensity, so than a minute circular or oval latent image of multi-value can be obtained.

However, in the case of the aforementioned image forming method, the configuration of a spot of a conventional laser beam projected onto the surface of a photoreceptor, is an oval, the major axis of which is in the auxiliary scanning direction. Therefore, as shown in FIG. 14-B, toner dots are connected in the auxiliary direction, so that longitudinal stripes appear on the image. Accordingly, in the case of a half-tone image, the quality of an image is deteriorated, especially in the case of an image of human's skin. Especially, in the case of pulse width modulation of 2 pixel unit, it is disadvantageous in that stripes are remarkable. In the region of a character image or line image (This region will be referred to as a character region, hereinafter.), unlike a half-tone image region (This region will be referred to as a half-tone region, hereinafter.), the frequency at which a laser beam spot passes through the same place, is low so that the change of electrical potential is small. For that reason, when image formation is conducted under the condition that the writing light amount of the semiconductor laser is the same, the diameter of the toner dot in the character region and that of the toner dot in the half-tone region are different. Accordingly, when the writing light amount to maintain the gradation of the half-tone region appropriately, is adopted, the gradation property of the character region is lowered, and sufficient density can not be provided. Further, when the writing light amount of the semiconductor laser is increased in order to obtain sufficient density of the character region, saturation is early caused in the half-tone region, and the gradation property is deteriorated.

The first object of the present invention is to provide an image forming method by which an image is formed when scanning is conducted by a laser beam which has been pulse-width-modulated or intensity-modulated, wherein the image forming method is characterized in that stripes caused when toner dots are connected with each other, do not occur in the auxiliary scanning direction; the gradation property is improved in both the character and half-tone regions; and a wide dynamic range is provided so that an image of high quality can be obtained.

Further, in the present invention, distribution of adjoining pixels is reflected in density distribution of objective recording pixels so that high quality recording can be conducted. The present invention relates to a color image forming apparatus in which: one matrix pixel image data is divided into small pixels m×n (the width×the length) considering the adjoining pixel data, and after that, the center of gravity of each line is found; the phase of the reference wave is deviated according to the center of gravity; and dot recording composed of n small scanning lines is conducted by the modulated signal of the pixel density data modulated by the reference wave signal so that a character and a halftone image can be reproduced. The recording apparatus of the present invention is used for a printing apparatus or a displaying apparatus.

In the field of an image forming apparatus based on an electrophotography, an image on an original is read as image signals by a scanner, and the image signals are subjected to gradation correction, A/D conversion and shading correction to be image density data. The image density data are modulated by reference wave signals so that digital images having therein reproduced half tone images may be obtained.

With regard to image signals obtained by reading an image on a original by a scanner, an edge portion of the image is read as a half tone image density due to an aperture of a solid image sensor incorporated in the scanner. When image density data obtained from the image signals cause a latent image on a photoreceptor, recording pixels corresponding to edges of the latent image are recorded on an average within recording pixels when density is medium. Therefore, sharpness of the image is deteriorated for recording. For this problem, there have been known MTF correction methods wherein a differential filter or a Laplacian filter is used for image signals for sharpening images. In these methods, however, only edge portions of an image are sharpened and uniformity of halftone images is relatively deteriorated.

Even when interpolation characters or graphics are formed by CG or font data, on the other hand, the same problem still happens. Namely, when interpolation data interpolate edge portions smoothly by means of medium density, recording pixels corresponding to the edge portions are recorded in pixels as the average density. Therefore, the sharpness of recorded images is deteriorated. For the above reason, medium density processing that works effectively on the edge portions of an image is required.

As a method to form a latent image in the manner described above, the following technical means is well known: a minute spot is formed by a single or a plurality of laser beams modulated by a recording signal; and dot exposure is conducted when a photoreceptor surface is scanned by the aforementioned minute spot.

For that reason, it is necessary to perform the medium density processing which substantially acts on the edge portion of an image. However, when the medium density processing is carried out at each color in the case of color image formation, the following problems are caused: image tone is varied; and characters are blurred.

The second object of the present invention is to provide an image forming method by which images are formed when scanning is performed by a modulated laser beam, wherein the image forming method is characterized in that: the occurrence of undesired strips can be prevented; and the sharpness is improved, so that images of high quality can be obtained.

SUMMARY OF THE INVENTION

The aforementioned first object of the present invention can be accomplished by an image forming method comprising the steps of: pulse width modulation or intensity modulation is conducted on a laser beam in accordance with density data corresponding to pixels; and the configuration of a laser beam spot formed on the photoreceptor is an oval, the major axis of which is disposed in the primary scanning direction.

Preferred embodiments of the present invention include an image forming method characterized in that: the writing light amount of laser beams in a character region is larger than that in a half tone region according to the result of discrimination between .the character region and the half tone region. Further, preferred embodiments of the present invention include an image forming method characterized in that: the aforementioned pulse width modulation is performed in the manner of 1-pixel-pulse-width modulation or 2-pixel-pulse-width modulation when the reference clock is changed over in accordance with the kind of an image.

Preferred embodiments of the present invention include an image forming method characterized in that: the maximum writing light amount of laser beams in a character region is larger than that in a half tone region according to the result of discrimination between the character region and the half tone region. Further, preferred embodiments of the present invention include an image forming method characterized in that: a duty ratio of control pulses which changes the amount of light by the period of time of control pulses, is made large in the character region as compared with in the half tone region.

The aforementioned second object of the present invention can be accomplished by an image forming method characterized in that: high density pixel recording is conducted according to the density data of a small pixel in an target pixel which has been determined in accordance with the density data of a pixel adjoining to the target pixel; the density data of the aforesaid target pixel conducts recording-position-modulation according to the density distribution which has been determined before; the ratio (a/b) is expressed by the following inequality, $$0.3 \times (d_2/nd_1) \leq (a/b) \leq 0.9 \times (d_2/nd_1)$$

where the recording unit of the primary scanning direction is $d_1$, the recording unit of the auxiliary scanning direction is $d_2$, the number of scanning in the recording unit is n, the diameter of a spot of the laser beam on the photoreceptor in the auxiliary scanning direction is a, and the diameter of the spot in the primary scanning direction is b; and the aforementioned recording-position-modulation is conducted by the selection of the reference wave signal in accordance with the average density in the primary direction.

The aforementioned object is accomplished by an image forming method utilized in an image forming apparatus provided with a laser optical system which scans the surface of the photoreceptor, wherein the image forming method is characterized in that: recording-position-modulation is conducted at least in the primary scanning direction; the major axis of a spot of the laser beam is disposed in the primary scanning direction; and the sensitivity of the photoreceptor is low when the amount of light is small, and high when the amount of light is large.

BRIEF DESCRIPTION OF THE DRAWINGS

FIG. 5 is a block diagram showing an example of the modulation circuit of the image processing circuit shown in FIG. 4;

FIG. 6(a), 6(b) and 6(c) are time charts showing each signal in the modulation signal generating circuit illustrated in FIG. 4;

FIG. 7 is a block diagram showing another example of the image processing circuit of the image forming apparatus shown in FIG. 4;

FIG. 8(a), 8(b) and 8(c) are time charts showing each signal in the modulation signal generating circuit shown in FIG. 7;

FIG. 14-A is a view showing the change of the size of a toner dot formed by a conventional laser beam;

FIG. 14-B is a view showing a state of connection of toner dots formed by the conventional laser beam;

FIG. 16-A is a view showing the configuration of a spot of a laser beam according to the present invention, wherein the spot is formed on a photoreceptor;

FIG. 16-B is a view showing a state in which toner dots of the laser beam of the present invention are connected with each other;

FIG. 17 is a block diagram of the image processing circuit of this example;

DETAILED DESCRIPTION OF THE PREFERRED EMBODIMENT

Figure 1:
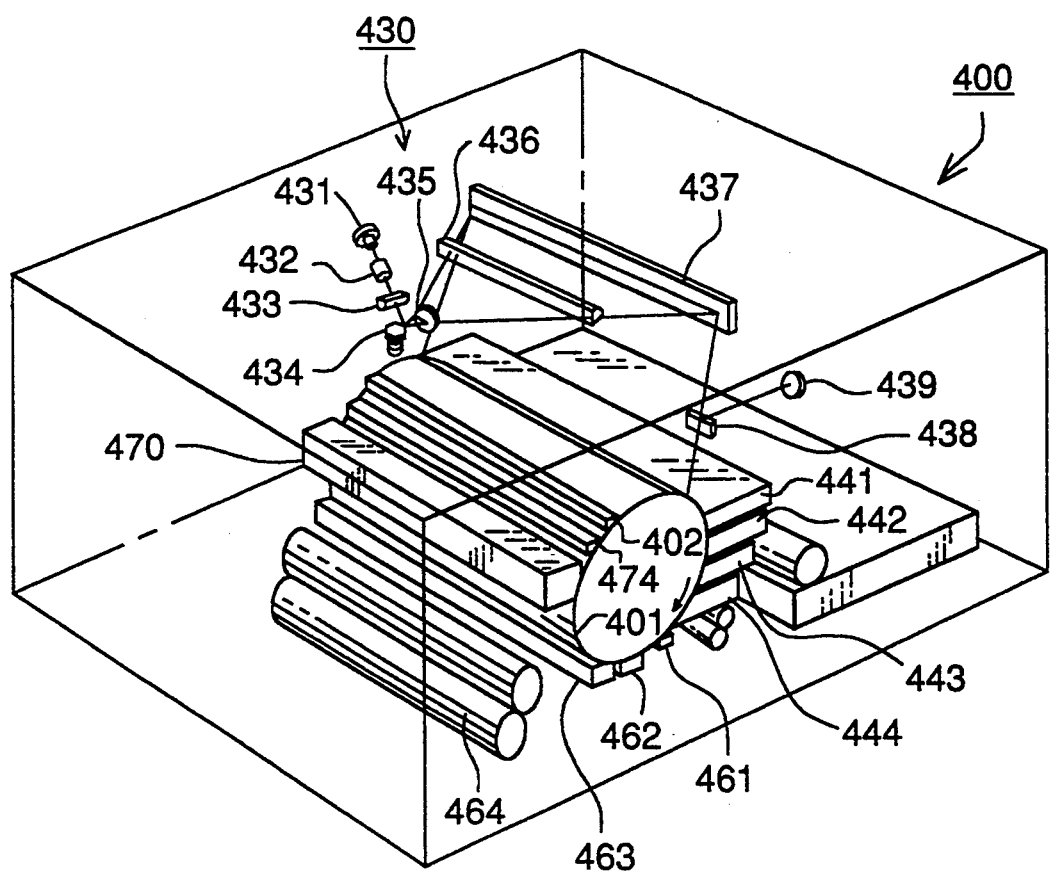
FIG. 1 is a perspective view showing the outline of the structure of an embodiment Of the image forming apparatus to which the present invention is applied.

The structure of an image forming apparatus which is an example of the present invention, will be described as follows. FIG. 1 is a perspective view showing the outline of the structure of the image forming apparatus of the present embodiment.

An image forming apparatus 400 acts the following functions in which: the photoreceptor is uniformly charged; after that, a dot-like electrostatic latent image is formed by a spot light which is pulse-width-modulated according to a modulation signal obtained by differentially amplifying an analog image density signal which is obtained by D/A converting digital image density data obtained from a computer or a scanner, and a reference wave signal, or the dot-like electrostatic latent image is formed by a spot light which is intensity-modulated according to the modulation signal obtained from the aforementioned analog signal image; a dot-like toner image is formed by reversal development of the latent image; charging, exposing, and developing are repeatedly conducted so that a color toner image can be formed on the photoreceptor; the color toner image is transferred onto a recording sheet; the recording sheet are separated from the photoreceptor; and then the image is fixed so that the color image can be obtained.

The image forming apparatus 400 is composed of: a photoreceptor which is a drum-like image forming body 401 rotated in the arrowed direction (hereinafter, it will be called simply a photoreceptor); a scorotron charger 402 by which the surface of the photoreceptor 401 is uniformly charged; an optical scanning system 430; developing units 441 to 444 in which yellow, magenta, cyan, and black toner are loaded; a pre-transfer charger 461; a scorotron transfer unit 462; a fixing roller 464; a separator 463; a cleaning unit 470; a discharger 474; and the like.

In the optical system 430, a laser beam emitted from the semiconductor laser 431 is made nearly parallel by the collimator lens 432. The image is exposed by this laser beam in the following manner: the laser beam is reflected by a rotational polygonal mirror 434 which is rotated at a constant speed; a minute laser spot is formed on the peripheral surface of the uniformly charged photoreceptor 401 by an fθ lens 435 and an cylindrical lens 436; and then the laser beam becomes a laser spot so that scanning can be conducted and then the image can be exposed. In the aforementioned optical system, the fθ lens 435 is a correction lens by which a constant speed optical scanning operation is conducted, and the cylindrical lenses 433 and 436 are lenses by which deviation of the position of the spot is corrected when the rotational polygonal mirror 434 is tilted. Numeral 437 is a scanning mirror which reflects laser beams. Numeral 438 is an index mirror. Numeral 439 is an index sensor. Start of scanning conducted by laser beams is detected by an index signal sent from the index sensor 439, and at the same time, the surface position of the rotational polygonal mirror 434 rotating at a predetermined speed is also detected so that the period of the primary scanning direction is detected. Due to the foregoing, the aforementioned laser beam spot scans the surface of the photoreceptor drum 401 in the direction parallel with the drum shaft.

The configuration of a laser beam spot formed on the photoreceptor 401 is an oval, the major axis of which is disposed in the primary scanning direction, and the following inequality is satisfied:

$$0.3 d2° \leq a \leq 1.0 d2°$$

where the length of the minor axis of the nominal diameter of a laser beam spot on the photoreceptor 401 (that is, the diameter of equal intensity line of $1/e^2$ of the maximum light intensity, in other words, 13.5% of the maximum light intensity), is a, the length of the major axis is b, a length of a pixel in the primary direction is d1°, and another length of the pixel in the sub-scanning direction is d2°.

It is preferable that the compression a/b is set as follows:

$$0.3 \ (d2°/d1°) \leq a/b \leq 0.9 \ (d2°/d1°)$$

More particularly, it is preferable that the compression a/b is set as follows:

$$0.4 \ (d2°/d1°) \leq a/b \leq 0.8 \ (d2°/d1°)$$

Usually, d1° and d2° are set as d1°=d2°.

Incidentally, b can be set to be larger than d1°, but b is preferably set to be b≦d1°.

Figure 2:
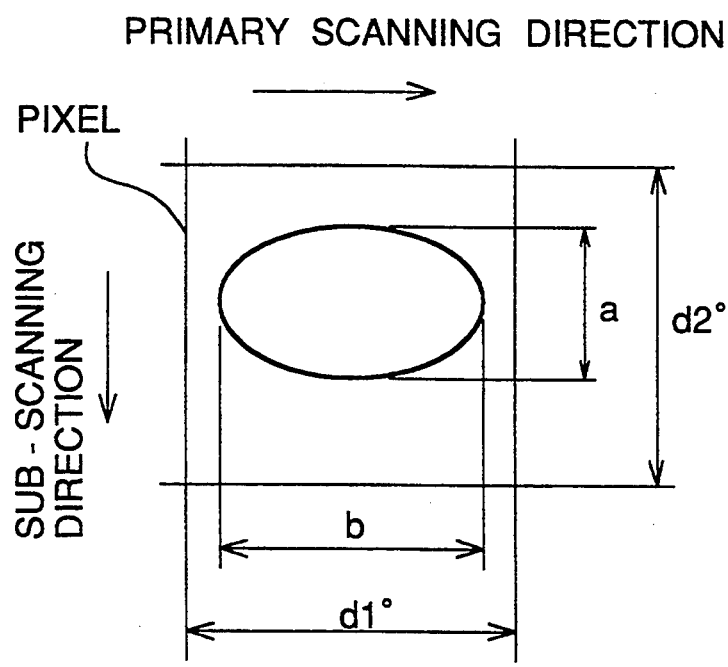
FIG. 2 is a plan view showing the configuration of a spot of a laser beam formed on a photoreceptor according to the present invention.
Figure 3:
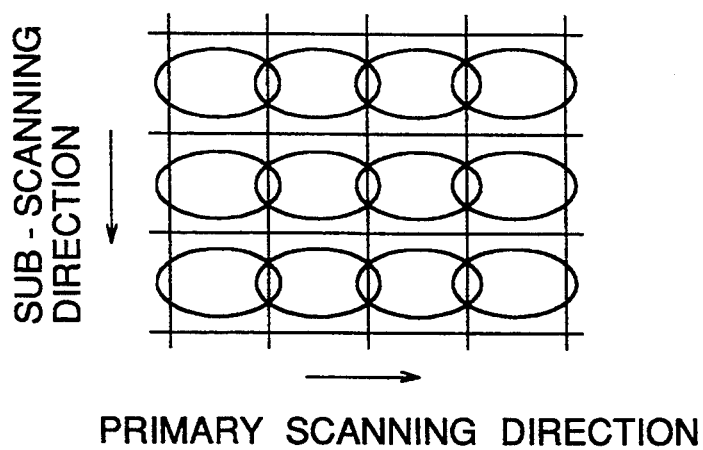
FIG. 3 is a view showing a state in which toner dots are connected with each other according to the laser beam shown in FIG. 2.

In the present invention, the major axis of the spot formed on the photoreceptor 401 is disposed in the primary scanning direction as shown in FIG. 2, so that the toner dots are not connected in the low density portion. In the case where image density is high and the pulse width becomes long, the toner dots are connected in the primary scanning direction as shown in FIG. 3. However, it is not so serious because the toner dot connection occurs in a high density portion.

In the case where the recording unit of the primary scanning direction is changed from 1 pixel to 2 pixels in order to improve the gradation property, the occurrence of lateral stripes can be prevented. Accordingly, the present invention can provide a desirable result.

Figure 13:
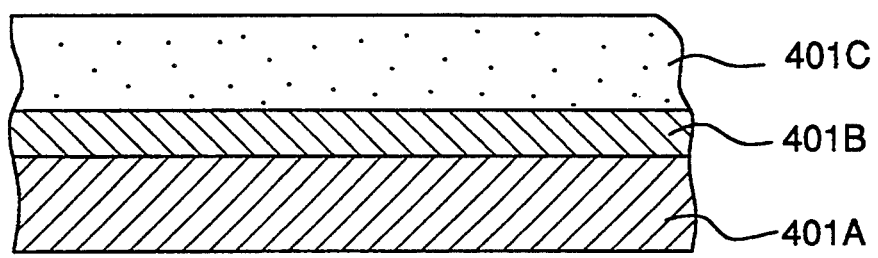
FIG. 13 is a sectional view of a specific high $\gamma$ photoreceptor used for this example.

The photoreceptor 401 used in the present embodiment has a high γ characteristic and FIG. 13 shows an example of its specific structure.

The photoreceptor 401 is formed by a conductive support 401A, an intermediate layer 401B, and a photosensitive layer 401C, as shown in FIG. 13. Thickness of the photosensitive layer 401C is about 5 to 100 μm, and preferably 10 to 50 μm. The photoreceptor 401 is structured in the following manner: a drum-like conductive support 401A, which is made of aluminum and has a diameter of 150 mm, is used for the photoreceptor; the intermediate layer 401B, which is made of ethylene-acetic acid vinyl copolymer and whose thickness is 0.1 μm, is formed on the conductive support 401A; and the photosensitive layer 401C, whose thickness is 35 μm, is provided on the intermediate layer 401B.

As the conductive support 401A, a drum, which is made of aluminum, steel, copper, and the like, and has a diameter of about 150 mm, is used, however, a belt-like body in which a metal layer is laminated or vapor-deposited on a paper or a plastic film, or a metallic belt such as a nickel belt, which is made by the method of electroforming, may be used as the conductive support. The intermediate layer 401B is preferably provided with the following properties: it can resist high charging voltage of ±500 V to ±2000 V; for example, in the case of positive charging, injection of electrons from the conductive support IC can be prevented; and Hall mobility can be provided so that superior light decay characteristics due to an avalanche phenomenon can be obtained. For the aforementioned reasons, positive charging type electric charge conveyance material, for example, disclosed in Japanese Patent Application No. 188975/1986 which has been proposed by the inventors of the present invention, is preferably added by not more than 10 weight % to the intermediate layer 401B.

As the intermediate layer 401B, the following resins, for example, which are used for a photosensitive layer of electrophotography, can be used normally.

(1) Vinyl polymer such as polyvinyl alcohol (Poval), polyvinyl methyl ether, and polyvinyl ethyl ether, (2) Nitrogen vinyl polymer such as polyvinylamine, poly-N-vinyl imidazole, polyvinyl pyridine (quarternary salt), polyvinyl pyrrolidone, and vinyl pyrrolidone-vinyl acetate copolymer, (3) Polyether polymer such as polyethylene oxide, polyethylene glycol, and polypropylene glycol, (4) Acrylic acid polymer such as polyacrylic acid and its salt, polyacrylamide, poly-β-hydroxy ethylacrylate, (5) Methacrylate polymer such as polymethacrylate and its salt, polymethacrylamide, and polyhydroxy propyl methacrylate, (6) Ether cellulose polymer such as methyl cellulose, ethyl cellulose, carboxy methyl cellulose, hydroxy ethyl cellulose, and hydroxy propyl methyl cellulose, (7) Polyethylene imine polymer such as polyethylene imine, (8) Polyamino acid such as polyalanine, polyserine, poly-L-glutamine acid, poly-(hydroxy ethyl)-L-glutamine, poly-δ-carboxy methyl-L-cysteine, polyproline, lysine-tyrosine copolymer, glutamic acid-lysine-alanine copolymer, silk fibroin, and casein, (9) Starch and its derivative such as starch acetate, hydroxyl ethyl starch, starch acetate, hydroxy ethyl starch, amine starch, and phosphate starch,

(10) Polymer which is soluble in mixed solvent of water and alcohol, such as soluble nylon, and methoxy methyl nylon (8 type nylon) which are polyamide.

The electric charge conveyance material is not used for the photosensitive layer 401C basically, and the photosensitive layer 401C is formed by the following manner: phthalocyanine minute particles, which are made of photoconductive pigment and whose diameter is 0.1 to 1 μm, antioxidant and binder resin are mixed and dispersed by using a solvent for the binder resin so that a coating liquid is prepared; the coating liquid is coated on the intermediate layer; and it is dried and thermally processed.

When the photoconductive material is used with the electric charge conveyance material, the photosensitive layer is structured by the following manner: the photoconductive material which is composed of the photoconductive pigment and a small amount of the electric charge conveyance material whose weight % is not more than 1/5, and preferably 1/1000 to 1/110 (weight ratio) of the photoconductive pigment, and the antioxidant is dispersed into the binder resin. When such the high γ photoreceptor is used, a sharp latent image can be formed although the diameter of the laser beam is spread, and thereby recording can be effectively conducted with high resolution.

In the present example, since color toner images are superimposed on the photoreceptor 401, the photoreceptor, which has spectral sensitivity on the infrared side, and a laser diode, which emits an infrared ray, are used so that a laser beam emitted from the optical scanning system 430 is not shaded by the color toner images.

Next, light decay characteristics of the high γ photoreceptor used in the present example, will be explained as follows.

Figure 12:
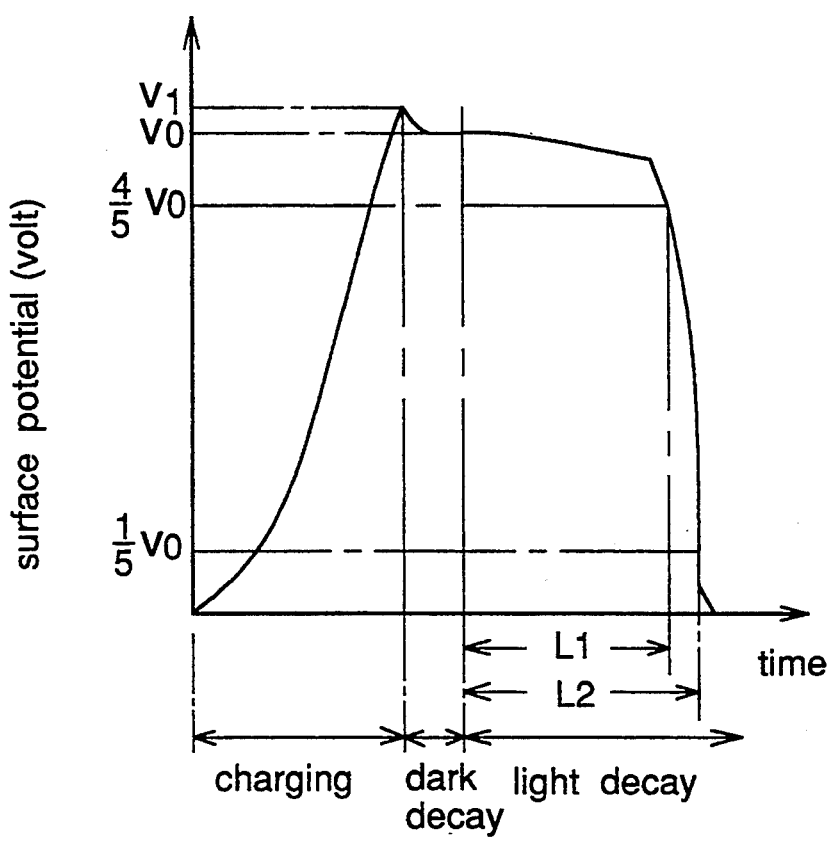
FIG. 12 is a graph showing the characteristics of a high $\gamma$ photoreceptor used for this example.

FIG. 12 is a graph showing characteristics of the high γ photoreceptor. In the drawing, $V_1$ is a charging potential (V), $V_0$ is an initial potential (V) before exposure, $L_1$ is an amount of irradiation (μJ/cm$^2$) of a laser beam which is necessary when the initial potential $V_0$ is decayed to 4/5, and $L_2$ is an amount of irradiation (μJ/cm$^2$) of a laser beam which is necessary when the initial potential $V_0$ is decayed to 1/5.

A preferable range of $L_2/L_1$ is $$1.0 < L_2/L_1 \leq 1.5$$

In the example, $V_1 = 1000$ (V), $V_0 = 950$ (V), $L_2/L_1 = 1.2$, and the photoreceptor potential of the exposure section is 10 V.

When light sensitivity in the position corresponding to a middle period of exposure at which the initial potential ($V_0$) is decayed to ½ in the light decay curve is defined as E½, and that in the position corresponding to an initial period of the exposure at which the initial potential ($V_0$) is decayed to 9/10 is defined as E9/10, a photoconductive semiconductor which gives the following relations is selected.

$$(E½)/(E9/10) \geq 2$$

and preferably, $$(E½)/(E9/10) \geq 5$$

In the aforementioned, the light sensitivity is defined as the absolute value of an amount of the potential lowering to a minute amount of exposure.

In the light decay curve of the photoreceptor 401, the absolute value of the differential factor of the potential characteristics, which means the light sensitivity, is small, as shown in FIG. 12, at the time of a small amount of light, and it sharply increases when an amount of light increases. Specifically, the light decay curve shows the following characteristics: it shows almost horizontal light decay characteristics because sensitivity characteristics are not good during several times of period at the initial period $L_1$ of exposure, as shown in FIG. 12; and however, it shows super high γ characteristics which are lowering almost linearly because it has suddenly super high sensitivity ranging from the middle period of exposure to the latter period thereof. It is considered that the photoreceptor 401 has high γ characteristics by making use of avalanche phenomena under the high charging voltage of, specifically, +500 to +2000 V. That is, it is considered that carriers generated on the surface of photoconductive pigment at the initial period of exposure are effectively trapped by an interface layer of the pigment and coating resin so that the light decay is positively prevented, and thereby extremely sudden avalanche phenomena are generated after the middle period of exposure.

In the present invention, the photoreceptor is preferably provided with high γ characteristics. However, a photoreceptor in which an amount of light and voltage drop are in a proportional relation may be used.

Figure 4:
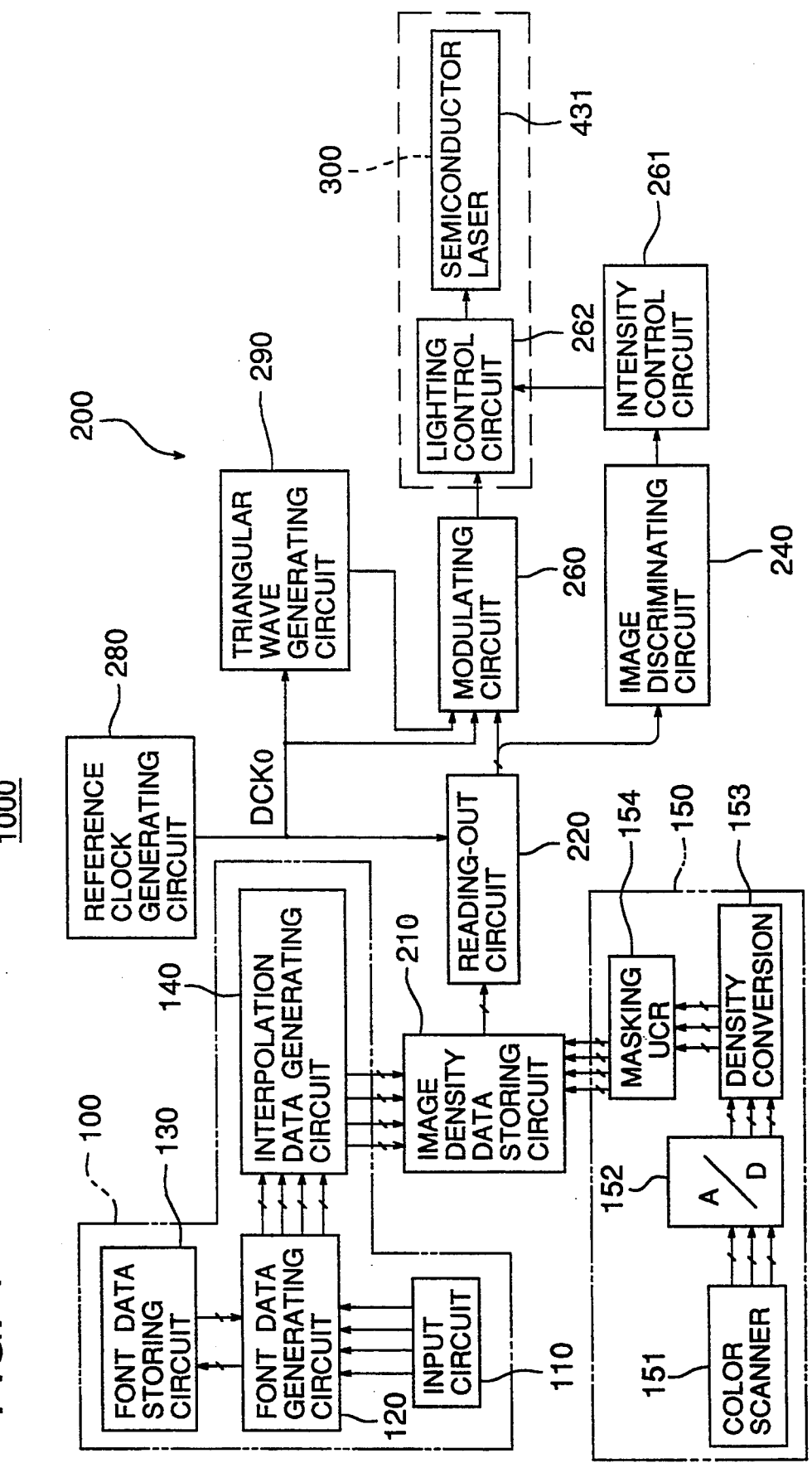
FIG. 4 is a block diagram showing an example of the image processing circuit of the image forming apparatus shown in FIG. 1, wherein pulse-width-modulation is carried out in the image processing circuit.

FIG. 4 is a block diagram showing an embodiment of the modulation circuit of pulse-width modulation utilized in an image forming apparatus to which the present invention is applied. FIG. 5 is a block diagram showing the modulation circuit of the present invention.

The image processing circuit 1000 of this example composes the drive circuit of the optical scanning system 430, and includes the image data processing circuit 100, modulation signal generating circuit 200, and raster scanning circuit 300.

Image data processing circuit 100 which interpolates an edge portion of font data and outputs is composed of input circuit 100 composed of a computer, font data generating circuit 120, font data storage circuit 130 and interpolation data generating circuit 140, and it sends character code signals from input circuit 110, size code signals, position code signals and color code signals to font data generating circuit 120. The font data generating circuit 120 selects address signals from four kinds of input signals and sends them to the font data storage circuit 130. The font data storage circuit 130 sends font data corresponding to one character that corresponds to the address signals to the font data generating circuit 120. The font data generating circuit 120 sends font data to the interpolation data generating circuit 140. The interpolation data generating circuit 140 interpolates, using medium density, a serrated or washed portion of image density data produced on the edge portion of the font data and sends them to image density data storage circuit 210 composed of a frame memory. With regard to colors to be generated, the relevant color is converted to density data of each of Y, M, C and BK. Thus, a font is subjected to bit map development in each frame memory with each color having the same form and different density rate.

Modulated signal generating circuit 200 is composed of image density data storage circuit 210, reading circuit 220, arithmetic processing circuit 241, 1-line-delay circuit 242, 1-clock-delay circuit circuit 243, modulation circuits 260A–260C, clock generating circuit 280, clock 3-division circuit 281 and triangular wave generating circuit 290.

Clock generating circuit 280 is a clock pulse generating circuit and it generates clock pulses having the frequency that is three times higher than that of an original pixel clock before RE-processing. A clock generated from the clock generating circuit 280 is one for a small pixel, and this is called threefold clock $DCK_3$ for convenience' sake and is outputted to clock 3-division circuit 281, arithmetic processing circuit 241, triangular wave generating circuit 290 and to modulation circuits 260A–260C. The clock 3-division circuit 281 is a circuit that divides frequency of input clock to ⅓ and it outputs a clock pulse whose cycle is identical to that of a clock of an original pixel with frequency that is one-third of threefold clock $DCK_3$. This clock is called reference clock $DCK_0$ for convenience sake and it is outputted to reading circuit 220 and arithmetic processing circuit 241.

The image density data storage circuit 210 is a normal page memory (hereinafter referred to simply as page memory 210), and is further a RAM (random access memory) storing with a unit of page, and it has a capacity for the storage of multi-valued image density data corresponding to at least one page (equivalent to one image). Further, when it is an apparatus to be employed in a color printer, it is caused to be provided with a page memory capable of storing image density data corresponding to a plurality of colors such as, for example, yellow, magenta, cyan and black.

The reading circuit 220 reads, from the image density data storage circuit (page memory) 210, the image density data corresponding to 3 continuous scanning lines in a unit of one scanning line that continues synchronizing with reference block $DCK_0$ with an index signal as a trigger, and sends it to the image discrimination circuit 240 and modulation circuit 260.

The triangular wave generating circuit 290 forms the configuration of a triangular wave, which is a reference wave, in accordance with reference clock $DCK_0$.

Figure 9:
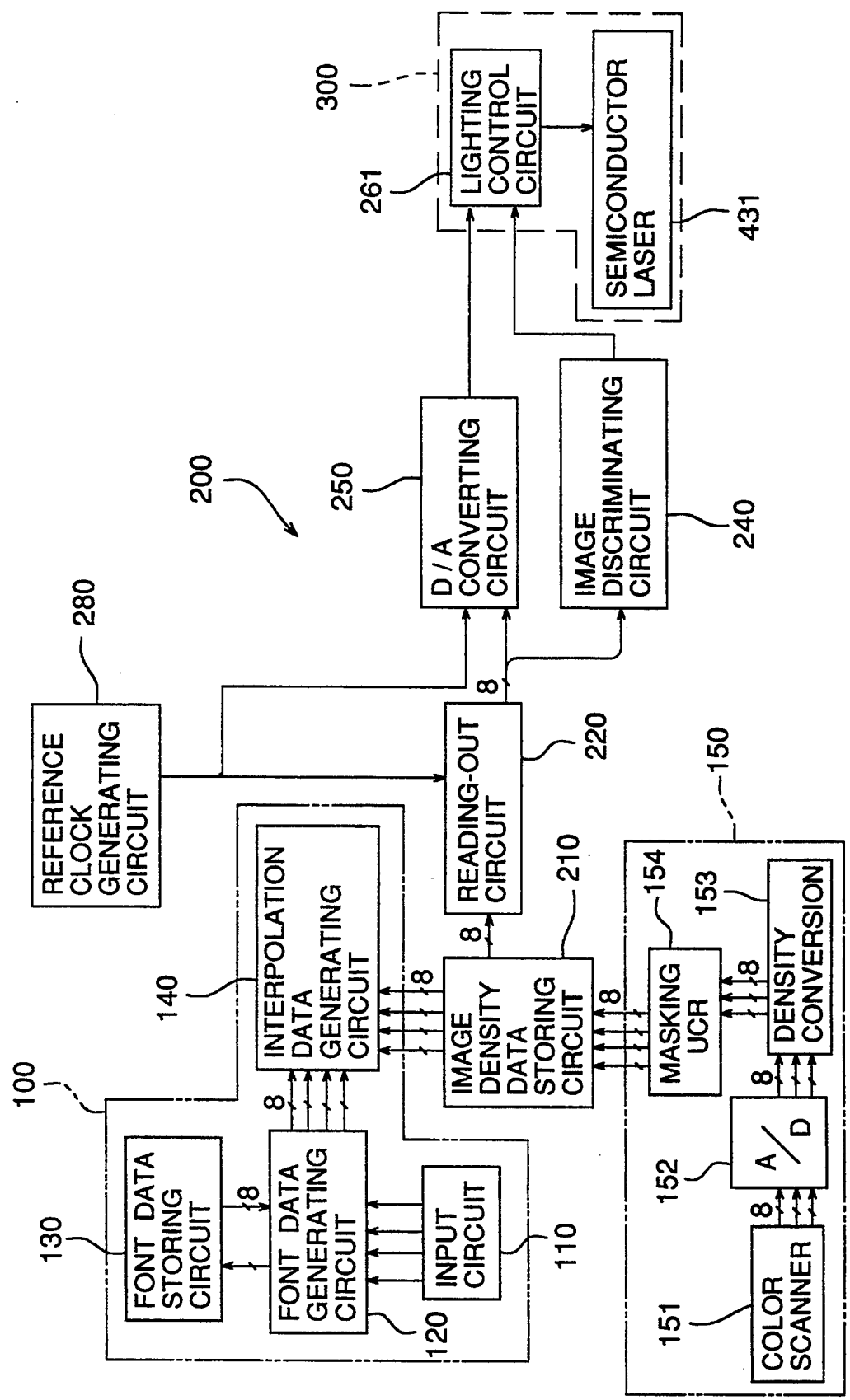
FIG. 9 is a block diagram showing an example of the image processing circuit of the image forming apparatus shown in FIG. 1, wherein intensity-modulation is performed in the image processing circuit.

The image discrimination circuit 240 is a circuit which judges whether an image is in the character region or in the half tone region. When it is judged that the image is in the character region, a signal is sent to the intensity control circuit 261 so that the writing light amount of the semiconductor laser 431 can be increased. In the case of the character region, the writing light amount of the semiconductor laser is set at 2 to 4 times as much as that in the medium region. Due to the foregoing, the latent image formation of an isolated point can be positively carried out, so that the reproducibility of characters can be improved. FIG. 9 shows a relation between the dot diameter and the light intensity.

An edge discrimination circuit may be adopted for the image discrimination circuit 240, wherein the edge discrimination circuit is operated in the following manner: for example, image density data corresponding to continuous pixels is successively differentiated; when a specific differentiation value is $\alpha$, it is judged that the image is in the character region if the differentiation value is not less than $\alpha$ or not more than $-\alpha$; in the case where the differentiation value is not less than $\alpha$, the pixels are on the left edge in the scanning line direction; and in the case where the differential value is not more than $-\alpha$, the pixels are on the right edge in the scanning line direction.

As shown in FIG. 5, the modulation circuit 260 includes the D/A conversion circuit 261a, comparator 262a, triangular input section T, input section CK for reference clock $DCK_0$, and image density data input section D. The modulation circuit 260 is operated in the following manner: image density data inputted from the reading circuit 220, is D/A-converted by the D/A-conversion circuit 261a synchronously with reference clock $DCK_0$; and the data is compared by the comparator 262a, using the aforementioned triangular wave as a reference signal, wherein 1 line of obtained modulation data is sent to the raster scanning circuit 300.

The raster scanning circuit 300 includes the lighting control circuit 262, semiconductor laser 431, index detection circuit not shown, and polygonal mirror driver.

The lighting control circuit 262 controls the lighting operation of the semiconductor laser 431 with the modulation signal sent from the modulation circuit 260. The lighting control circuit 262 changes over the writing light amount of the semiconductor laser 431 by the signal sent from the intensity control circuit 261 which is activated by the control signal sent from the image discrimination circuit 240, and at the same time, a signal corresponding to the laser beam amount sent from the semiconductor laser 431 is fed back to the lighting control circuit 262 so that the writing light amount can be constant.

The index detection circuit detects a surface position of the rotating polygonal mirror 434 which is rotated at a predetermined speed, by an index signal sent from the index sensor 439, so that the optical scanning according to the modulated digital image density signal can be conducted by the raster scanning system at a period of the primary scanning direction.

The driver to drive the polygonal mirror is composed of a DC motor which is rotated at a predetermined speed so that the rotating polygonal mirror 434 can be rotated at a constant speed.

Next, operations of the modulation signal generating circuit 200 will be explained as follows.

FIGS. 6(a) to 6(c) are time charts showing each signal sent from the modulation signal generating circuit in the aforementioned example.

In FIG. 6, (a) shows a portion of the image density data corresponding to pixels which are read out from the page memory 210 in accordance with reference clock $DCK_0$ wherein the index signal is used as a trigger. The image density data is converted into analog values by the D/A-conversion circuit 261a, and the higher the level is, the lower the density is, and the lower the level is, the higher the density is.

In FIG. 6, (b) shows a triangular wave (shown by a solid line) that is a reference wave successively outputted from the triangular wave generation circuit 290, and also shows an image density signal (shown by a dotted line) which has been converted into the aforementioned analog value, so that (b) shows a modulating operation conducted in the modulation circuit 260.

In FIG. 6, (c) shows a pulse width modulation signal generated when a comparing operation has been conducted by the comparator 262a.

FIG. 7 is a block diagram showing another image processing circuit 1000 of the example in which pulse-width modulation is carried out.

Like parts in each of FIGS. 4 and 7 are identified by the same reference character, so that the detailed explanation will be omitted here. In the circuit shown in FIG. 4, the density of the character region and the gradation property of the half tone region are improved when the writing light amount of the semiconductor laser 431 in the character region and that in the half tone region are changed with each other. However, in the circuit shown in FIG. 7, the image processing circuit 1000 is structured so that the image quality can be improved in such a manner that: a reference wave to be used for the modulation circuit 260 is selected by the image discrimination circuit 240 so that it can be appropriate for the region. Accordingly, the aforementioned intensity control circuit 261 is not necessary in this case. The triangular A generating circuit 291 is a circuit which generates triangular wave A, the period of which is the width of 2 pixels suitable for the half tone region. The triangular wave B generating circuit 292 is a circuit which generates triangular wave B, the period of which is the width of 1 pixel suitable for the character region. The aforementioned triangular waves A and B select a reference wave suitable for the region by the selection circuit 255 which is activated by the selection signal sent from the image discrimination circuit 240, and then sends the reference wave to the modulation circuit 260. As a result, pulse-width-modulation in which the changeover between 1-pixel and 2-pixels is performed, is carried out in accordance with the image regions shown in FIG. 8.

In FIG. 8, (a) shows a portion of image density data corresponding to pixels which are read out from the page memory 210 in accordance with reference clock $DCK_0$, wherein the index signal is used as a trigger. The image density data is converted into analog values by the D/A-conversion circuit 261a, and the higher the level is, the lower the density is, and the lower the level is, the higher the density is.

In FIG. 8, (b) shows a triangular wave (shown by a solid line) that is a reference wave successively outputted from the triangular wave generation circuit 290, and also shows an image density signal (shown by a dotted line) which has been converted into the aforementioned analog value, so that (b) shows a modulating operation conducted in the modulation circuit 260.

In FIG. 8, (c) shows a pulse width modulation signal generated when a comparing operation has been conducted by the comparator 262a.

In the aforementioned example, an image is discriminated by the image discrimination circuit 240 whether it is in the character region or in the half tone region, and the writing light amount of the semiconductor laser 431 or the period of the reference wave is automatically changed over. Of course, the changeover may be conducted arbitrarily and independently by a command sent from the outside, or the changeover may be conducted concurrently with the aforementioned automatic changeover. Also, the character processing or the half tone processing may be uniformly conducted all over the image in accordance with the kind of the image.

FIG. 9 is a block diagram showing an example of the image processing circuit in which intensity modulation is performed, wherein the image processing circuit is used for the image forming apparatus to which the present invention is applied.

The modulation circuit 200 includes the image density data storing circuit 210, reading circuit 220, image discrimination circuit 240, D/A circuit 250, intensity control circuit 261, and reference clock generating circuit 280.

The reference clock generating circuit 280 is a reference clock pulse generating circuit, which generates a clock pulse, the period of which is the same as that of the pixel clock. The clock outputted from the reference clock generating circuit 280 is referred to as reference clock $DCK_0$, which is outputted to the reading circuit 220 and the D/A circuit 250.

The D/A circuit 250 latches the image density data for the period of time in which the processing is carried out by the image discrimination circuit 240, and D/A-converts the image density data.

The intensity control circuit 261 is a control circuit which changes the intensity of a laser beam in accordance with the density data corresponding to the pixels inputted through the aforementioned D/A circuit 250, and changes over the maximum writing light amount in accordance with a control signal sent from the image discrimination circuit 240. One line of intensity modulation signals obtained in the manner mentioned above, are sent to the raster scanning circuit 300.

Figure 10:
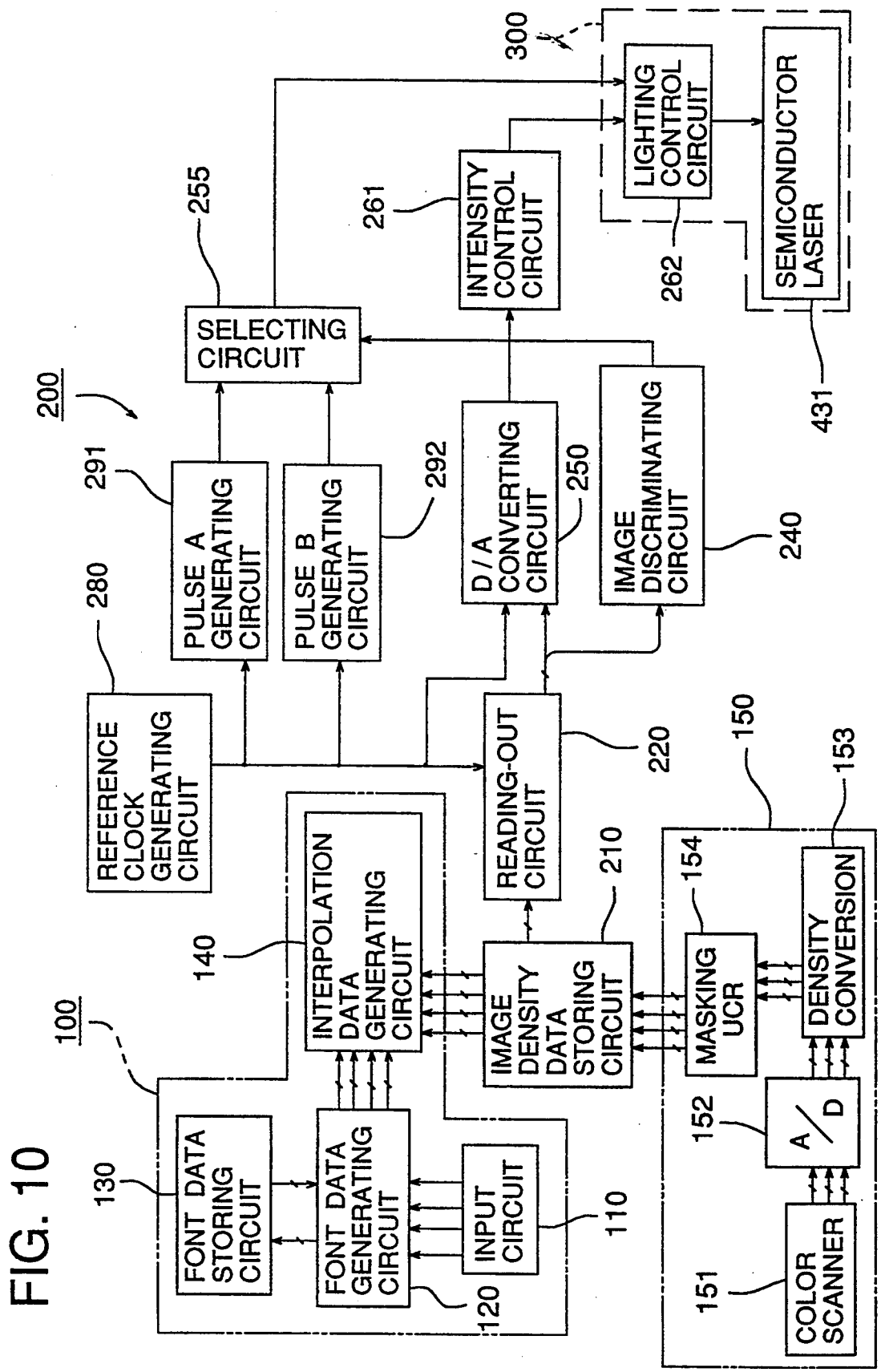
FIG. 10 is a block diagram showing another example of the image processing circuit of the image forming apparatus shown in FIG. 9.

FIG. 10 is a block diagram showing another image processing circuit 1000 of the example in which intensity modulation is performed.

Figure 11:
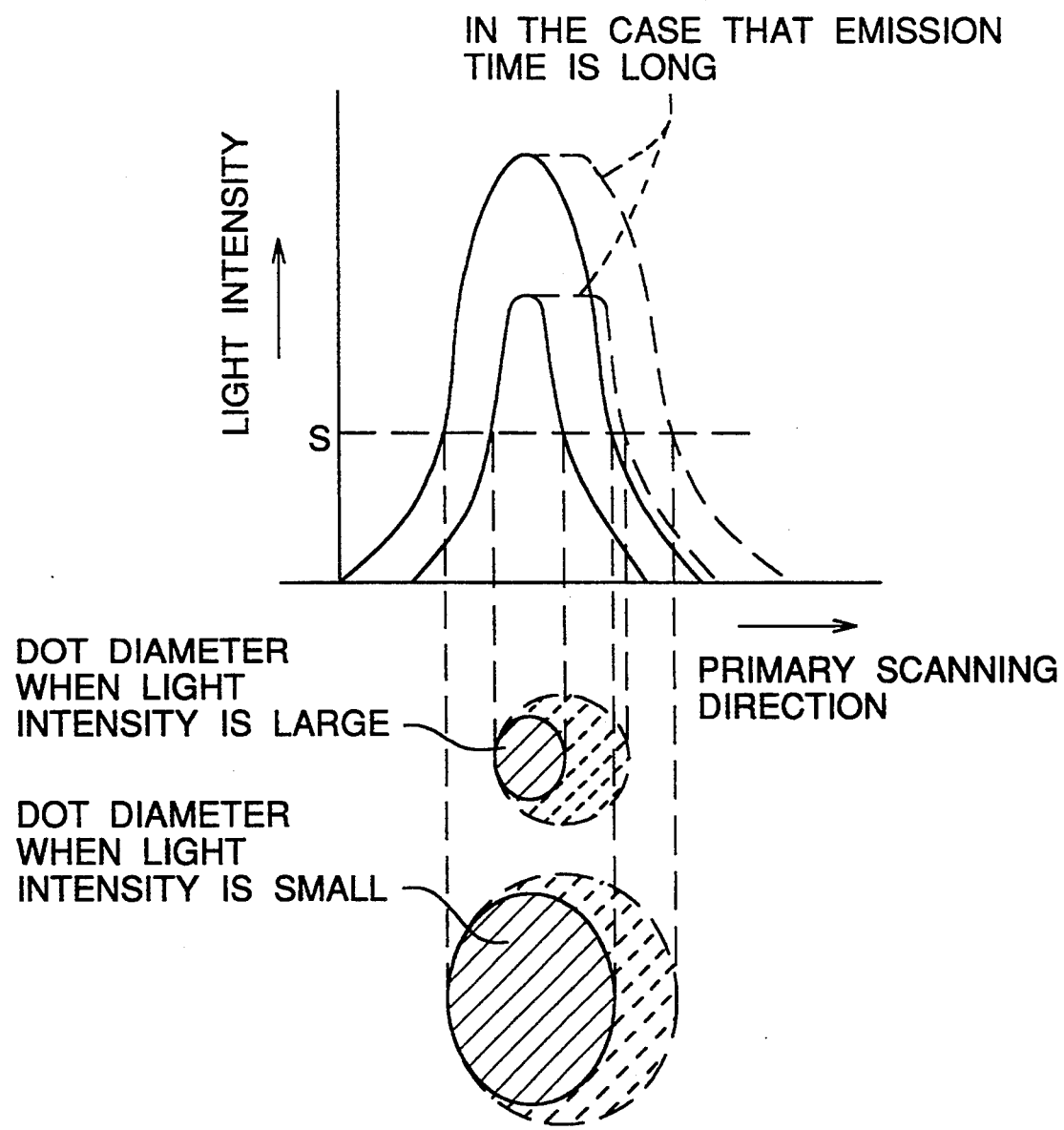
FIG. 11 is a view showing a relation between the light intensity distribution and dot diameter of a beam spot.

Like parts in each of FIGS. 9 and 10 are identified by the same reference character, so that the detailed explanation will be omitted here. In the circuit shown in FIG. 9, the density of the character region and the gradation property of the half tone region are improved when the writing maximum light amount of the semiconductor laser 431 in the character region and that in the half tone region are changed with each other. The image processing circuit 1000 accomplishes the aforementioned object when the length of the control pulse for lighting the semiconductor laser 431 is changed. That is, the image processing circuit 1000 is a circuit in which image quality is improved when a control pulse of the duty ratio which has been judged to be suitable for the region by the image discrimination circuit 240, is sent to the lighting control circuit 262. The pulse A generating circuit 291 generates a control pulse (pulse A), the duty ratio of which is suitable for the half tone region. The pulse B generating circuit 292 generates a control pulse (pulse B), the duty ratio of which is higher than that of the pulse A so that it is suitable for the image region. According to the aforementioned control pulses A and B, a control pulse, the duty ratio of which is suitable for the region, is selected by the selection circuit 255 which is activated by the selection signal sent from the image discrimination circuit 240, and the selected pulse is sent to the lighting control circuit 262, so that the light emitting time of the semiconductor laser 431 is changed at each dot. Accordingly, the light emitting time is extended in the character region as shown by a dotted line in FIG. 11, so that the image density can be increased. In the character region, the pulse width is set at 2 to 4 times as much with regard to the medium region. Due to the foregoing, the latent image of an isolated point can be positively formed, and the reproducibility of characters can be improved.

In the aforementioned example, it is judged whether an image is in the character region or in the half tone region, and the maximum writing light amount of the semiconductor laser 431 or the duty ratio of the control pulse is automatically changed over. Of course, the aforementioned changeover operation may be arbitrarily and independently conducted by a command sent from the outside. According to the kind of an image, the character processing or half tone processing may be uniformly performed all over the image.

The image forming process of the image forming apparatus 400 in the aforesaid example will be explained as follows.

After discharged by the discharging unit 474, the photoreceptor 401 is uniformly charged by the scorotron charger 402. An electrostatic latent image corresponding to yellow is formed on the photoreceptor 401 when a laser beam which has been light-modulated or intensity-modulated in accordance with yellow data (digital density data of 8 bits) stored in the image density data memory circuit 210, is irradiated on the surface of the photoreceptor 401. The aforesaid electrostatic latent image corresponding to yellow is developed by the first developing unit 441, and the first dot-shaped toner image (yellow toner image) is formed on the photoreceptor 401. While this first toner image is not transferred onto a recording paper, it passes under the cleaning unit 470 which has been withdrawn from the surface of the photoreceptor. Then, the surface of the photoreceptor 401 is charged again by the scorotron charger 402.

Next, a laser beam is modulated by magenta data (digital density data of 8 bits), and the modulated laser beam is irradiated on the surface of the photoreceptor 401 so that an electrostatic latent image is formed. This electrostatic latent image is developed by the second developing unit 442, and the second toner image (magenta toner image) is formed. An electrostatic latent image is developed by the third developing unit 443 in the same manner as described before, so that the third toner image (cyan toner image) is formed. Accordingly, a 3-color toner image in which color toner images are successively stacked, is formed. Finally, the fourth toner image (black toner image) is formed, so that a 4-color toner is formed on the photoreceptor 1.

The aforementioned 4-color toner image is transferred onto a recording paper supplied from the paper supply unit, by the action of the transfer unit 462.

The recording paper onto which the toner image is transferred, is separated from the photoreceptor 401 by the separator 463, and conveyed to the fixing roller 464 by a guide and conveyance belt not shown so that the toner image is thermally fixed. After that, the recording paper is discharged onto a discharge tray. On the other hand, the photoreceptor 401 which has completed the transfer operation, is cleaned by the cleaning unit 470 which has been released from the withdrawal, so that the photoreceptor 401 is prepared for the next image formation.

The image processing circuit 1000 has been explained above in the case where it is applied to a laser printer. However, the present invention is not limited to the specific embodiment. The image processing circuit can be applied to other image forming apparatus such as a copier when the image data processing circuit 100 is replaced with an image data processing circuit 150 including a color scanner 151, A/D conversion circuit 152, density conversion circuit 153, and masking UCR circuit 154, so that the image density data corresponding to the pixel sent from the scanner can be inputted for image processing.

As described above, the present invention is to provide an image forming method in which a modulation signal is generated in such a manner that intensity modulation is performed according to the image density data corresponding to pixels, or image density data is pulse-width modulated, so that image recording is carried out according to this modulation signal, wherein the major axis of an oval formed by the spot of the laser beam is disposed in the primary scanning direction, and wherein the maximum writing light amount of the semiconductor laser in the character region is made larger than that in the half tone region. Therefore, the occurrence of undesired stripes can be prevented in the low density region, and the density of the character region of the image to be formed is made high and the gradation property of the half tone region is improved. Therefore, the present invention can provide an excellent image forming method of a wide dynamic range.

Structure to accomplish the second object of the present invention will be explained as follows.

Figure 15:
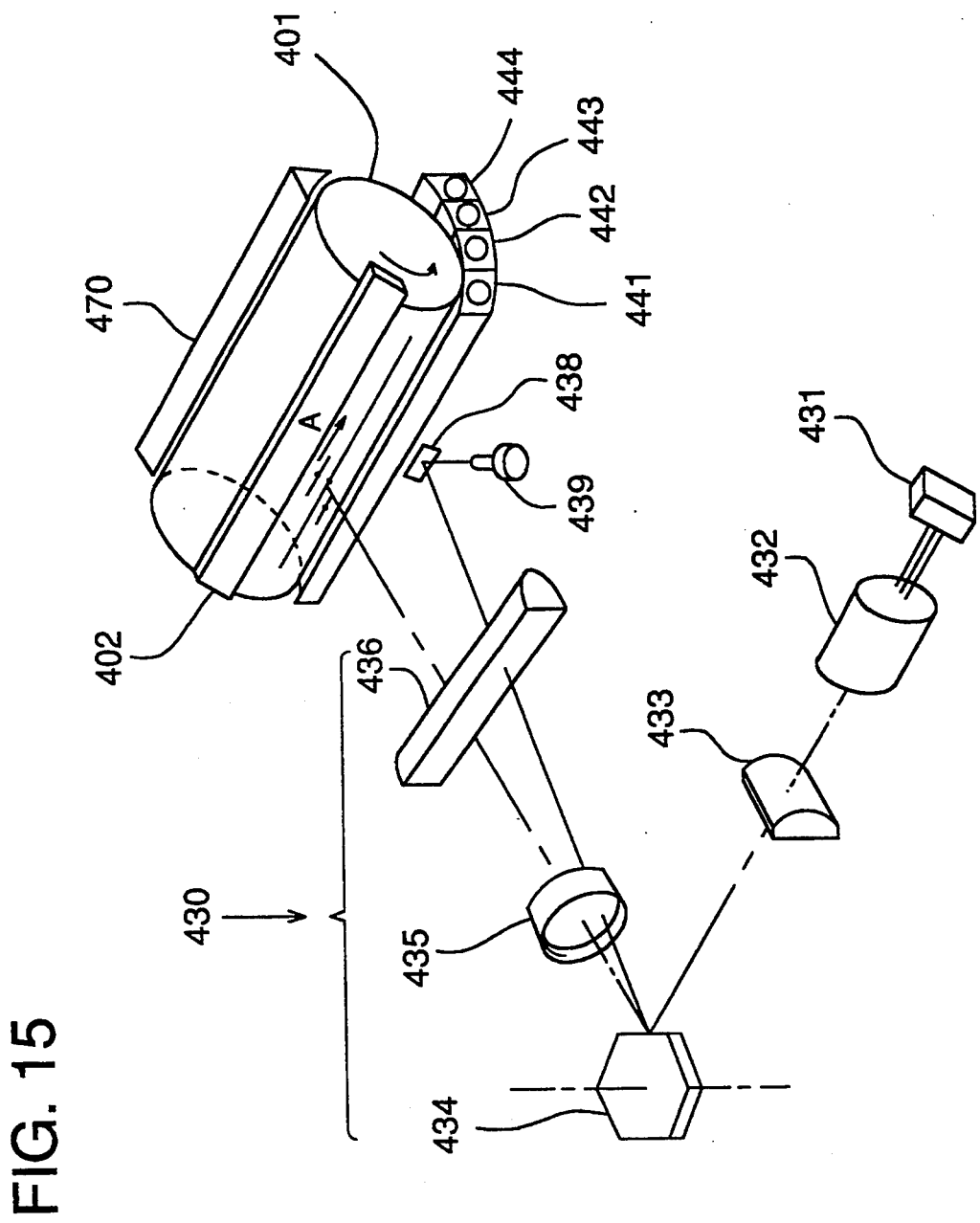
FIG. 15 is a perspective view illustrating a image-writing condition in the image forming apparatus of the invention.

As shown in FIG. 15, the optical scanning system 430 of this example is structured in such a manner that: a laser beam emitted from the semiconductor laser 431 having 3 light emitting point, is made parallel by the collimator lens 432.

The configuration of the laser beam spot formed on the photoreceptor 401 is an oval, the major axis of which is disposed in parallel with the primary scanning direction as shown in FIG. 16 (the case of n=3 is shown here), and ratio (a/b), that is, the compression of the aforementioned oval preferably satisfies the following inequality $$0.3 \times (d_2/nd_1) \leq (a/b) \leq 0.9 \times (d_2/nd_1)$$

where the length of the minor axis in the auxiliary scanning direction of the nominal diameter of the laser beam spot on the photoreceptor 401 (that is, the diameter of equal intensity line of $1/e^2$ of the maximum light intensity, in other words, 13.5% of the maximum light intensity), is a, the length of the major axis in the primary scanning direction is b, the length of one pixel in the primary scanning direction is $d_1$, that is, the recording unit in the primary scanning direction is $d_1$, the recording unit in the auxiliary scanning direction is $d_2$, and the number of scanning operations in the recording unit is n.

More preferably, the compression of the oval is as follows.

$$0.4 \times (d_2/nd_1) \leq (a/b) \leq 0.8 \times (d_2/nd_1)$$

In this case, a and b are expressed as follows.

$$0.3 \times (d_2/n) \leq a \leq 1.5 \times (d_2/n),\ 0.3 d_1 \leq b \leq 1.5 d_1$$

Further, it is preferable that the laser beam intensity is set at 2 to 4 times as much as the half decay exposure of the photoreceptor. Usually, $d_1$ and $d_2$ are set equal.

In the present invention, the major axis of the laser beam spot formed on the photoreceptor 401, is disposed in parallel with the primary scanning direction, so that the toner dots are not connected with each other in the auxiliary scanning direction in the low density portion and the occurrence of longitudinal stripes can be avoided. In the case where the image density becomes high, the toner dots are sometimes connected with each other as shown in FIG. 3. However, the connection occurs in a high density portion due to the recording position modulation in the primary scanning direction. Consequently, the image quality is not deteriorated so much.

An image forming apparatus for color use in the present example will be explained as follows. In the image forming apparatus, one looked pixel portion of image density data is composed of small pixels in the quantity of m×n (horizontal ×vertical) and the density data distribution of the adjoining pixels including the looked pixel is converted to the distribution of the small pixels in the quantity of n×m in the aforementioned one pixel, and the image density data of the small pixels obtained by distributing the data of the looked pixel multiplied by the constant P according to the aforesaid distribution are used for forming an image by changing dot writing positions for n lines through the displacement of phases of reference waves in each line of small pixels. The displacement of writing positions is called a printing position modulation. The process for converting the looked pixel into image density data of small pixels each divided into quantity of m×n is assumed to be resolving power enhancement processing (RE processing). The RE processing makes it possible to print on a high density basis. A photoreceptor with a high γ is especially effective for forming a latent image responding correctly to the reference wave.

In this invention, RE processing is conducted when ① the image density data of the objective pixel is not less than a first threshold value, that is, not less than the specific density, namely the first threshold value. In many portions of an area corresponding to a highlight portion, RE processing is not conducted on a background portion of a document, and small pixels m×n are caused to have a uniform density. In the case of CRT, this data display can be conducted.

However, in the case of laser recording which will be described later, it is difficult to display the data uniformly, and therefore, the reference wave whose density center exists in the center of the image density, is selected. Due to the aforementioned, uniformity in the highlight portion can be kept, and a noisy image can be prevented from occurring.

② In the case of high density, and a steep density gradient, when a reference wave whose density recording position does not exist in the center is selected, dots are formed in the manner that they overlap with the adjoining pixel.

In order to prevent a density change and recording dot blocking between pixels, when the image density data of the objective pixel is not less than a specific second threshold value, and also in a high density portion, a reference wave whose density center exists in the center of the image density, is selected.

Since a uniform display can be conducted in the case of CRT, the densities of small pixels m×n are processed as a uniform density. That is, RE processing is not conducted.

In a color image forming apparatus in which high density image recording is conducted according to density distribution data in the objective pixel which is determined corresponding to density data of the pixel adjoining the objective pixel, a color image forming apparatus is preferable which is characterized in that, when a specific density data of the objective pixel is not less than the first threshold value recording position modulation is conducted according to the determined density distribution.

Further, a color image forming apparatus is preferable which is characterized in that, when a specific density data of the pixel is not more than the second threshold value, recording position modulation is conducted according to the determined density distribution.

Figures 20A, 20B:
FIGS. 20(a) and 20(b) are views showing RE-processing used for reference wave phase determination.

FIG. 20(a) is a diagram in which the adjoining pixels including the objective pixel m5 are expressed as m1 to m9 when the objective pixel is defined as m5, and the objective pixel m5 is divided into 3×3 small pixels. FIG. 20(b) is an enlarged view in which each small pixel is expressed by s1 to s9 when the objective pixel is divided into small pixels of 3 ×3. m1 to m9 and s1 to s9 also express the density of each portion.

RE processing will be explained in detail as follows. Taking the example of the case where the objective pixel m5 is divided into 3×3 small pixels, density of a small pixel is determined by the following equation.

$$si = (9 \times m5 \times P \times mi/A) + (1-P) \times m5$$

Where i=1, 2, ..., 9, and P is a constant, which is called strength for RE processing, and in which the range of 0.1 to 0.9 is used, and A is the sum total of m1 to m9.

In the above equation, a term of $(9 \times m5 \times P \times mi/A)$ expresses a density in which the density of the objective pixel m5 multiplied by P is distributed to each pixel according to density ratio of the adjoining pixels, and the term $(1-P) \times m5$ expresses a density in which the residual density of the objective pixel m5 is distributed equally to each small pixel, so that an element of unsharpness is taken into the equation.

Figures 21A, 21B:
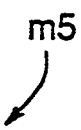
FIGS. 21(a) and 21(b) are views showing an example in which a target pixel of RE-processing is divided into $3 \times 3$ and p=0.5.
Figure 22A:
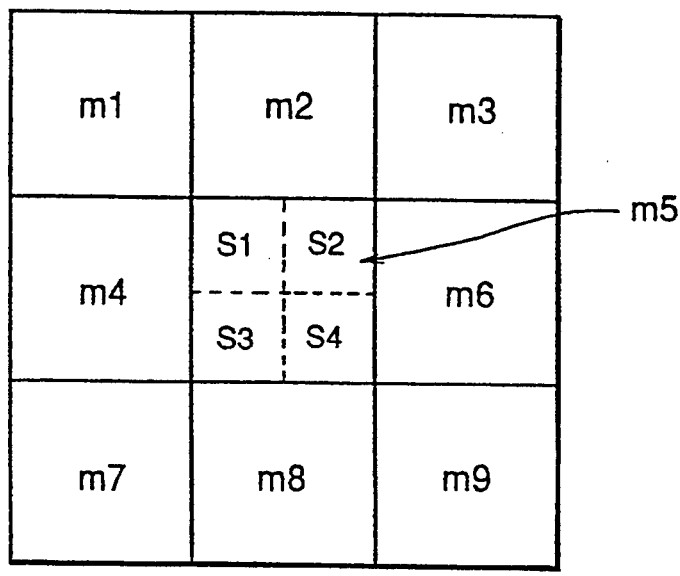
FIGS. 22(a) and 22(b) are views showing an example in which a target pixel of RE-processing is divided into $2 \times 2$.
Figure 22B:
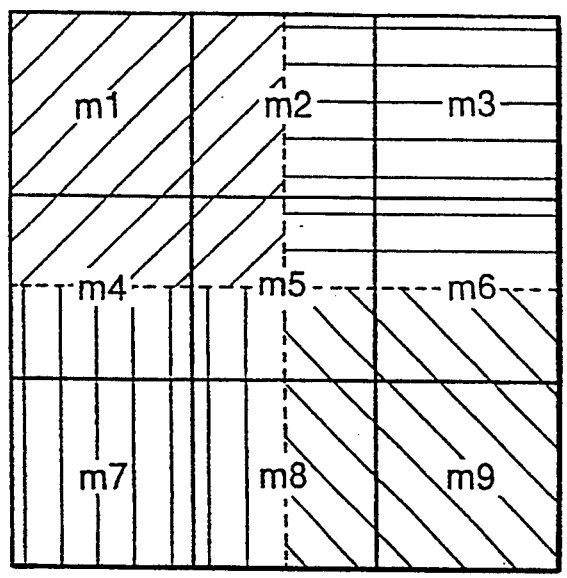

FIGS. 21(a) and 21(b) are illustrations showing an example in which the objective pixel m5 is divided into 3×3 small pixels, and P=0.5. FIG. 21(a) is an illustration showing an example of the density distribution of the adjoining pixels including the objective pixel m5. FIG. 21(b) is an illustration showing the density distribution in the objective pixel m5 which is calculated by P=0.5.

FIGS. 22(a) and 22(b), and FIGS. 23(a) and 23(b) show an example in which the objective pixel m5 is divided into 2×2 small pixels.

FIG. 22 (a) is an illustration showing an example in which the objective pixel m5 is divided into 2×2 small pixels. FIG. 22 (b) is an illustration showing an example of the adjoining pixels relating to small pixels s1 to s4 in the objective pixel.

Density of s1, s2, s3, and s4 is calculated according to Equation 1.

$$s1 = \frac{4m1 + 2(m2 + m4) + m5}{A} \times m5 \times P + (1 - P) \times m5 \quad \text{(Equation 1)}$$

$$s2 = \frac{4m3 + 2(m2 + m6) + m5}{A} \times m5 \times P + (1 - P) \times m5$$

$$s3 = \frac{4m7 + 2(m4 + m8) + m5}{A} \times m5 \times P + (1 - P) \times m5$$

$$s4 = \frac{4m9 + 2(m6 + m8) + m5}{A} \times m5 \times P + (1 - P) \times m5$$

where A is the total sum of m1 to m9.

Figure 23A:
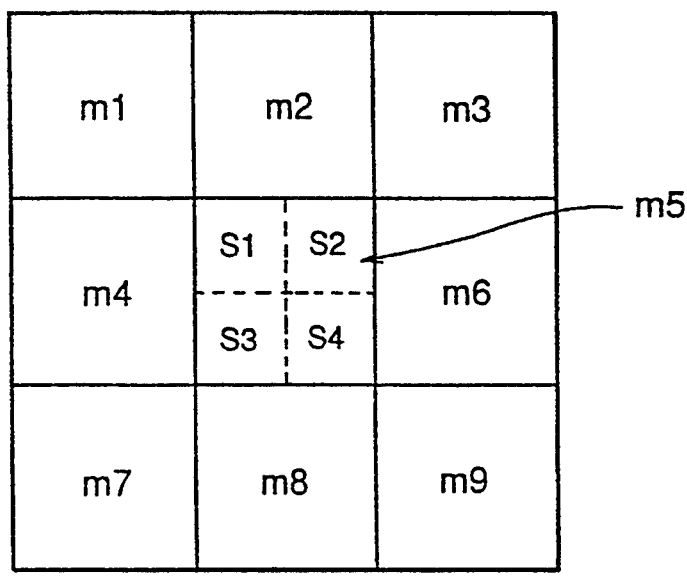
FIGS. 23(a) and 23(b) are views showing another example in which a target pixel of RE-processing is divided into $2 \times 2$.
Figure 23B:
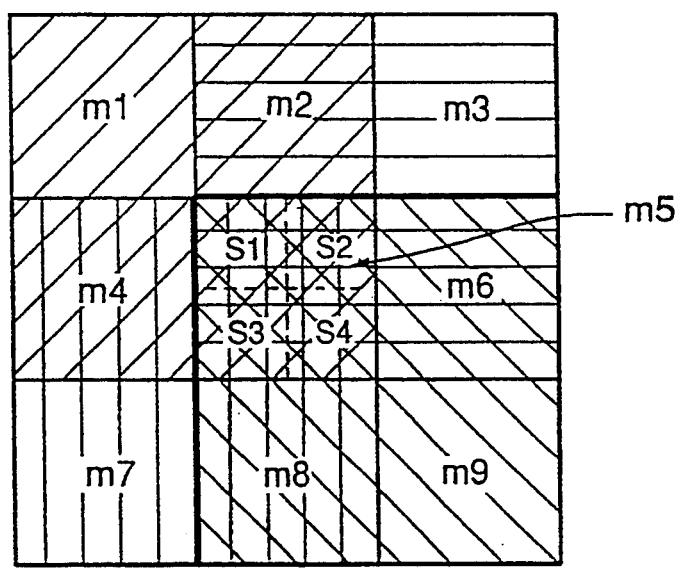

FIG. 23 (a) is an illustration showing another example in which the objective pixel m5 is divided into 2×2 small pixels. FIG. 23(b) is an illustration showing another example of the adjoining pixels relating to small pixels s1 to s4 in the objective pixel. Density calculation of s1, s2, s3, and s4 is conducted according to Equation 2.

$$s1 = \frac{m1 + m2 + m4 + m5}{A} \times \frac{9}{4} \times m5 \times P + (1 - P) \times m5 \quad \text{(Equation 2)}$$

$$s2 = \frac{m2 + m3 + m5 + m6}{A} \times \frac{9}{4} \times m5 \times P + (1 - P) \times m5$$

$$s3 = \frac{m4 + m5 + m7 + m8}{A} \times \frac{9}{4} \times m5 \times P + (1 - P) \times m5$$

$$s4 = \frac{m5 + m6 + m8 + m9}{A} \times \frac{9}{4} \times m5 \times P + (1 - P) \times m5$$

where A is the total sum of m1 to m9.

Figure 18:
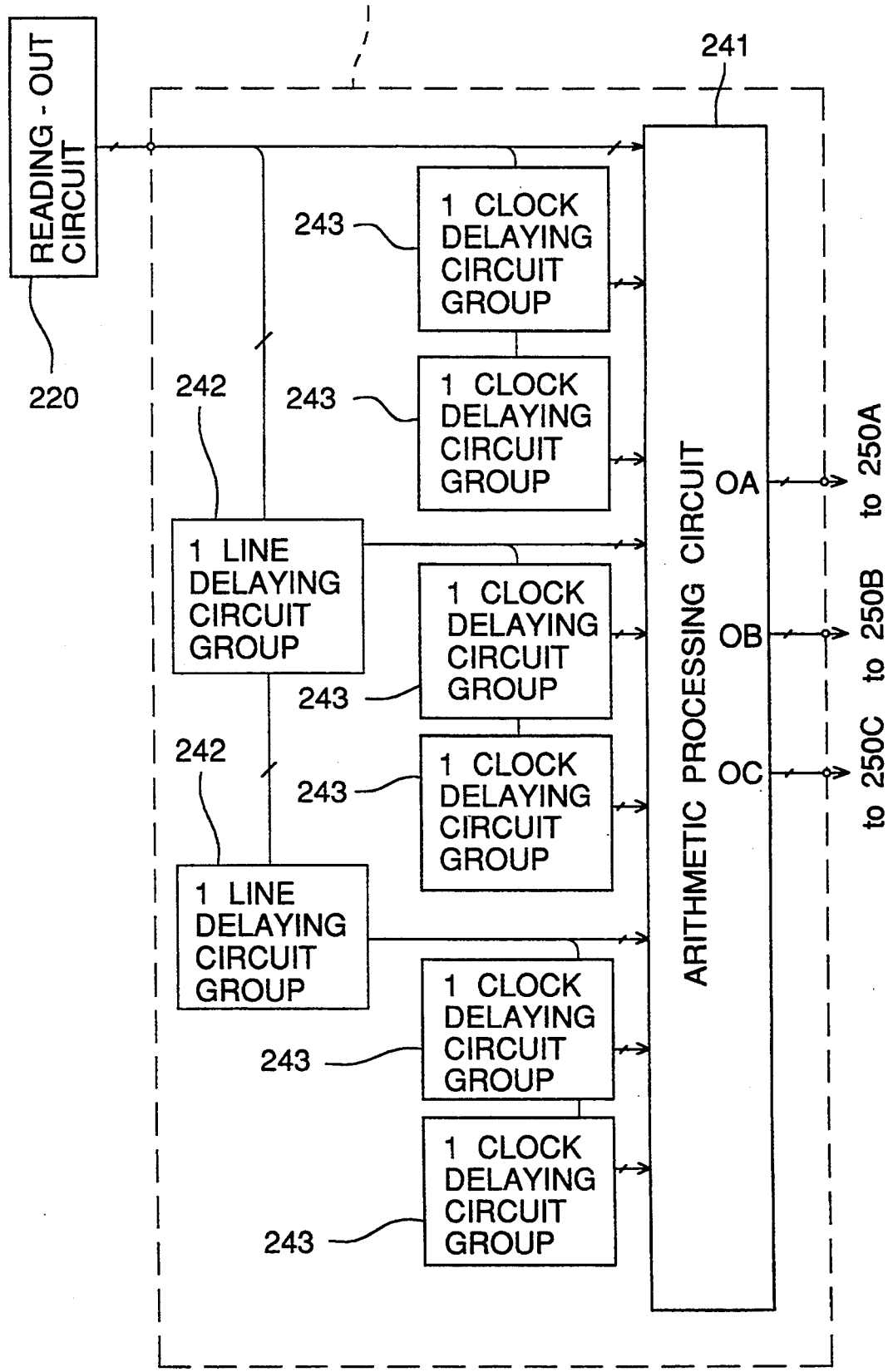
FIG. 18 is a block diagram showing an example of the reference wave phase determination circuit in the circuit shown in FIG. 1.
Figure 19:
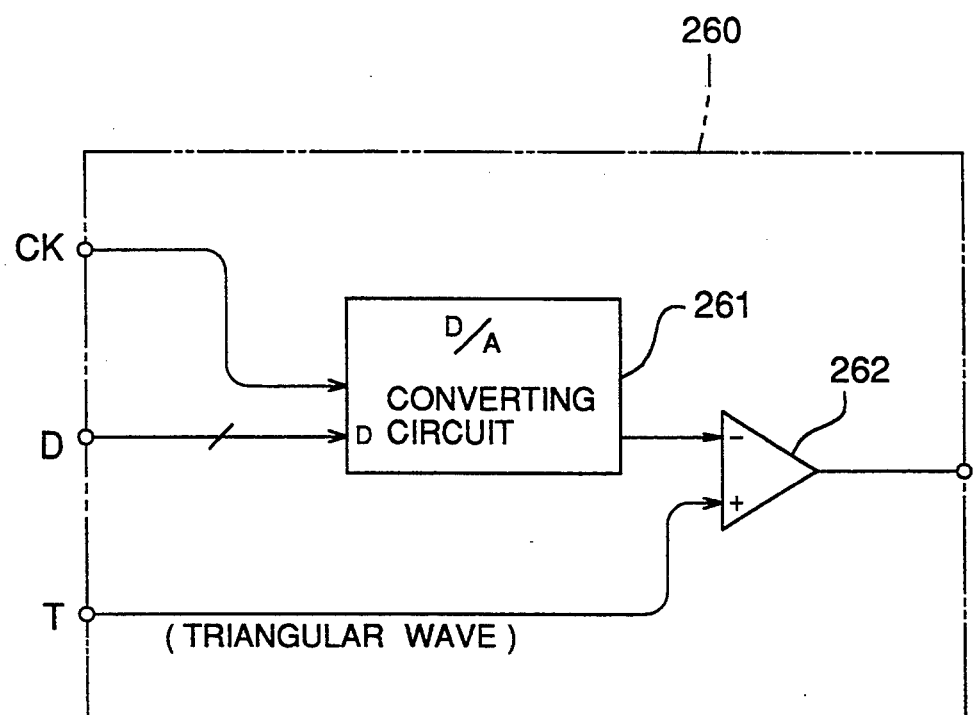
FIG. 19 is a block diagram showing an example of the modulation circuit in the circuit shown in FIG. 1.

FIG. 17 is a block diagram showing an example of an image processing circuit which is used in a color image forming apparatus of the present invention (an example in which the objective pixel is divided into 3×3). FIG. 18 is a block diagram showing the circuit for determining a reference wave phase in the present example and FIG. 19 is a block diagram showing a modulation circuit in the present example.

Image processing circuit 1000 of the present embodiment, is a circuit which structures a driving circuit of an optical scanning system, and is composed of an image data processing circuit 100, a modulation signal generator 200 and a raster scanning circuit 300.

The image data processing circuit 100 is a circuit which interpolates an edge portion of font data and outputs it, and composed of an input circuit 110 including a computer, a font data generator 120, a font data resister 130, and an interpolation data generator 140, and sends a character code signal from the input circuit 110, a size code signal, a position code signal and a color code signal to a font data generator 120. The font data generator 120 selects an address signal from four kinds of input signals and sends it to the font data register 130. The font data register 130 sends font data corresponding to one character which corresponds to an address signal to the font data generator 120. The font data generator 120 sends the font data to the interpolation data generator 140. The interpolation data generator 140 interpolates indentation or jumping of the image density data, which is generated at the edge portion of the font data by intermediate density, and sends it to an image density data register 210 which is composed of a frame memory. Concerning the generated color, corresponding colors are converted into density data of yellow (Y), magenta (M), cyan (C), and black (B) corresponding to a color code. Due to the aforementioned, a font is bit-map-developed in each frame memory under the condition that each color has the same shape, and the ratio of density is different.

The modulation signal generator 200 is structured by the image density data register 210, a read-out circuit 220, a latch circuit 230, an image discrimination circuit 231, an MTF correction circuit 232, a γ correction circuit 233, reference wave phase determination circuit 240, select circuits 250A–250C, modulation circuits 260A–260C, reference clock generating circuit 280, triangular wave generation circuit 290 and delay circuits group 291.

The image density data register 210 is an ordinary page memory (hereinafter, it will be referred to as a page memory), and a RAM (random access memory) which stores data by every one page, and has a capacity which can store multi-value image density data corresponding to at least one page (1 image plane). When it is accepted for a color printer, the printer is provided with a page memory which can store an image density signal corresponding to each color component of a plurality of colors, for example, yellow, magenta, cyan, and black.

The read-out circuit 220 reads out continuous image density data of every one scanning line, which is continued in synchronization with the reference clock $DCK_0$, from the image density data register (page memory) 210, and sends it to the reference wave phase determination circuit 240, the image discrimination circuit 231, and MTF correction circuit 232, wherein an index signal is used as a trigger.

The latch circuit 230 is a circuit which latches the image density data only when the reference wave phase determination circuit 240 (which will be explained later) is conducting processing.

The reference clock generator 280 is a pulse generating circuit, and generates pulse signals having the same cycle period as in the pixel clock, and then sends them to the read-out circuit 220, triangular wave generation circuit 290, delay circuits group 291 and modulation circuits 260A–260C. For convenience' sake, this clock is called reference clock $DCK_0$.

The numeral 290 represents a triangular wave generating circuit and it forms a waveform of reference triangular wave $\phi_0$ that is a reference wave with the same cycle as that of a pixel clock, based on reference clock $DCK_0$. In delay circuits group 291, a plurality of clocks $DCK_1$–$DCK_4$ each having a phase difference of fixed cycles (1/6 cycles in the present example) against reference clock $DCK_0$ are generated, and based upon these, triangular waves $\phi_1$–$\phi_4$ which are reference waves having different phases (triangular wave $\phi_1$ advanced by 1/6 cycles, triangular wave $\phi_2$ advanced by 2/6 cycles, triangular wave $\phi_3$ delayed by 1/6 cycles and triangular wave $\phi_4$ delayed by 2/6 cycles in the present example) are outputted.

Select circuits 250A–250C have portions for inputting triangular waves $\phi_1$–$\phi_4$ having phases deviated from the aforementioned reference triangular wave $\phi_0$ and select one of the above-mentioned triangular waves by means of selection signals from reference wave phase determination circuit 240 stated later to send it to input terminal T in modulation circuits 260A–260C.

In the modulation circuits 260A–260C which are the same in terms of circuit structure as shown in FIG. 19 and are provided with D/A converter circuit 261, comparator 262, and input portion T for the aforementioned reference triangular wave $\phi_0$ or triangular waves each being delayed by 1/6 cycles in phase, image density data inputted through latch circuit 230 are D/A-converted by D/A converting circuit 261 synchronizing with reference clock $DCK_0$ and then compared with a reference wave which is the triangular wave inputted from select circuits 250A–250C, thereby pulse-width-modulated signals are obtained.

In the reference wave phase determination circuit 240 that is composed of 1-line delay circuit 242, 1-clock delay circuit 243 and arithmetic processing circuit 241 as shown in FIG. 18, the 1-line delay circuit 242 gives delay corresponding to two-line scanning time to the image density data for the first scanning line among three scanning lines of image density data transmitted one line by one line, delay corresponding to one-line scanning time to the image density data for the second scanning line, and no delay to the image density data for the last scanning line. Further, by giving delays each equivalent to 2 reference clocks and 1 reference clock to each image data by means of 1-clock delay circuit 243, image density data for all pixels including looked pixel and pixels adjoining the looked pixel are sent simultaneously to arithmetic processing circuit 241.

In the arithmetic processing circuit 241, RE processing mentioned above is conducted and density data of small pixels are obtained. With regard to the density data of small pixels obtained in the arithmetic processing circuit 241, data equivalent to 3 scanning lines of small pixels consisting of a scanning line including s1, s2, s3 ... in FIG. 20, a scanning line including s4, s5, s6 ... and a scanning line including s7, s8, s9 ... correspond to those of one scanning line of the original pixel.

Figure 24:
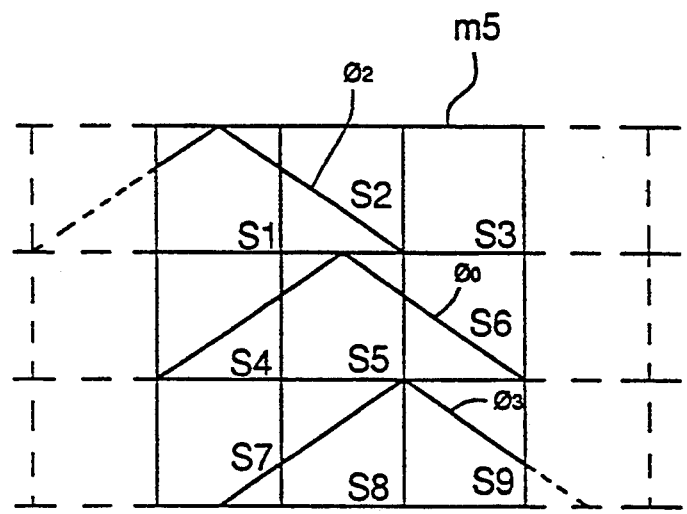
FIG. 24 is a view to explain the phase displacement of a reference wave.

The arithmetic processing circuit 241 further conducts operation for obtaining average density of each small scanning line and a position of the center of gravity of density data in the original pixel in each small scanning line, and outputs the average density data to laser drivers 301A–301C for emission and outputs different signals selected from the data of the position of the center of gravity from output terminals OA–OC to select circuits 250A–250C. Namely, signals selecting reference triangular wave $\phi_0$ having no phase displacement are outputted when the center of gravity of s1, s2 and s3 (first small scanning line) of pixel m5 is in the vicinity of the center of s2, signals selecting triangular wave $\phi_1$ whose phase is advanced by 1/6 cycles are outputted when the center of gravity is in the vicinity of a boundary between s2 and s1, signals selecting triangular wave $\phi_2$ whose phase is advanced by 2/6 cycles are outputted when the center of gravity is in the vicinity of the center of s1, signals selecting triangular wave $\phi_3$ whose phase is delayed by 1/6 cycles are outputted when the center of gravity is in the vicinity of a boundary between s2 and s3 and signals selecting triangular wave $\phi_4$ whose phase is delayed by 2/6 cycles are outputted when the center of gravity is in the vicinity of the center of s3, all from the output terminal OA to the select circuit 250A. In the same manner as in the foregoing, signals selecting a triangular wave in the second scanning line determined by the center of gravity of s4, s5 and s6 of the pixel m5 are outputted from output terminal OB to select circuit 250B and signals selecting a triangular wave in the third scanning line determined by the center of gravity of s7, s8 and s9 of the pixel m5 are outputted from output terminal OC to select circuit 250C. FIG. 24 is a diagram showing an example of the relation between triangular waves having different phases mentioned above and the aforementioned looked pixels.

Figure 28:
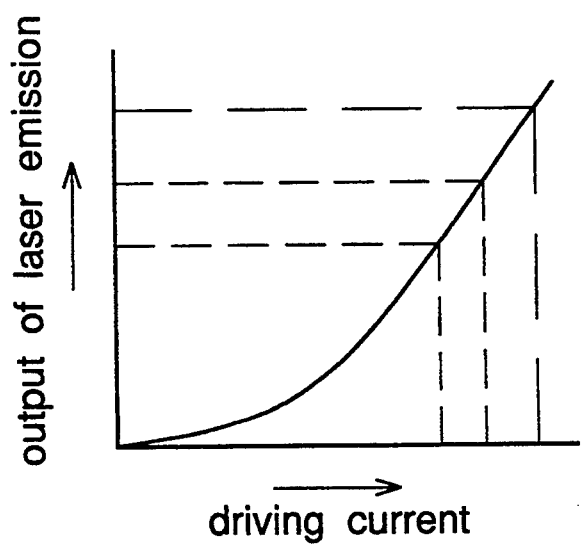
FIG. 28 is a graph showing an example of a relation between the drive current of a semiconductor laser and the laser beam emitting power.

The arithmetic processing circuit 241 controls an emission output of laser drivers 301A to 301C corresponding to the average density in the pixel m5 of each small scanning line. For example, the circuit 241 controls a semiconductor laser 301A to emit the beam in proportion to the average density of s1, s2 and s3. FIG. 28 is a graph showing an example of the relation between a driving current of the semiconductor laser and the output of laser emission.

The image discrimination circuit 231 compares the image data of the objective pixel with a predetermined first threshold value, and with a predetermined second threshold value. After that, when the image data of the objective pixel is discriminated to be out of the region of the first and second threshold values, selected signals outputting reference triangular wave $\phi_0$ only are sent to select circuits 250A–250C regarding all selected color components with the triangular wave selected by reference wave phase determination circuit 240 that is not outputted, and the MTF correction circuit 232 is not operated. Due to the aforementioned, the image density data which is read out from the read-out circuit 220 is not corrected by the MTF correction circuit 232, and after it has been corrected by the $\gamma$ correction circuit 233, it is sent to modulation circuits 260A to 260C through the latch circuit 230.

Due to the aforementioned, it is possible to form an image having high uniformity and no noise in the highlight and high density regions.

The image discrimination circuit 231 further discriminates, under the aforementioned conditions, which of the character region and halftone region the image belongs to. The discrimination is conducted by the density change in 5×5 pixels including the objective pixel. When the density change of the region is large, the discrimination circuit discriminates that the objective pixel belongs to the character region, and when the density change of the region is small, the circuit 231 discriminates that the objective pixel belongs to the halftone region. When discriminated to be the character region of characters and lines, selection signals outputting triangular waves selected by the aforesaid reference wave phase determination circuit 240 for all color components to modulation circuits 260A–260C are outputted to select signals 250A–250C and the MTF correction circuit 232 and the $\gamma$ correction circuit 233 are not operated, and the image density data, while they are not processed, are sent through the latch circuit 230 to modulation circuits 260A to 260C. Due to the aforementioned, a sharp character or edge portion whose color is not changed, can be reproduced. Further, when the circuit 231 discriminates that the image belongs to the halftone region, selection signals identical to those in the character region are outputted only for non-color components, namely, for black, and for other components, selection signals which do not output triangular waves selected by the reference wave phase determination circuit 240 but output reference triangular wave $\phi_0$ only are sent to select circuits 250A–250C, and MTF correction circuit 232 and $\gamma$ correction circuit 233 are operated. Thereby, image density data read by read-out circuit 220 for those other than black are corrected by the MTF correction circuit 232 and the $\gamma$ correction circuit 233 and then are sent to modulation circuits 260A–260C through latch circuit 230.

Due to the aforementioned processing, it is possible to form an image free from moire fringe pattern and color-jumping streaks by means of a laser spot in a shape of an ellipse whose major axis is in parallel with the primary scanning direction, and also an effect by which an image is given sharpness and compactness by black image is generated.

A density data in which a specific color, for example, is converted into the density data of R+2G+B, (in this case, R is a density data of red, G is that of green, and B is that of blue), is used as the image density data used for determination of the phase of the reference wave. For convenience' sake, the density data of (R+2G+B) will be expressed by N, hereinafter.

When the phase of the reference wave is used in common with respect to each recording color, gradation of an image can be assured, and color change can be prevented. For determination of the phase of the reference wave, a G component which visually coincides with the image density data, or achromatic data having the G component is preferably used.

For the same reason, the data which is used for the image discrimination circuit 231 is data which is common with each color.

The modulation circuits 260A to 260C operate in the following manner: the signal of the image density data inputted through the latch circuit 230 by the triangular wave that is a reference wave selected is modulated; after that, the modulation signal which is pulse width modulated by the circuit, is generated; and the circuit sends out the modulation signal to the raster scanning circuit 300 after three small scanning lines (one scanning line in the case of the original image density data) in which these modulated signals are continued in parallel, are made to be one unit.

Next, operation of the modulation signal generator 200 will be explained as follows.

FIGS. 25(a) to (d) are time charts showing a signal in each position of the modulation signal generator in the case where the signal is recording-position-modulated.

In FIG. 25, (a) shows a portion of the signal in which the image density data read out according to the reference clock $DCK_0$ from the page memory 210 making the index signal a trigger, is converted into an analog value by the D/A converter 261. The higher the level is, the lighter is the density shown, and the lower the level is, the darker is the density shown.

Figure 25A:
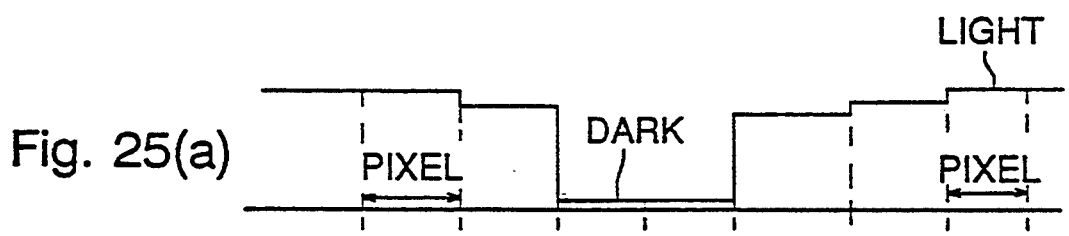
FIGS. 25(a) and 25(b) are time charts showing each signal of the modulation signal generating circuit of the example shown in FIG. 1.
Figure 25B:

FIG. 25(b) shows the triangular wave which is the reference wave including ones outputted successively from the select circuit 250 and delayed.

Figure 25C:

FIG. 25(c) shows the triangular wave (solid lines), and the image density signal (dashed lines) which is converted into the analog value, and shows the modulation operations in the modulation circuits 260A to 260C.

Figure 25D:

FIG. 25(d) shows the pulse width modulation signal which is generated after the signal has been compared by the comparator 262.

Due to the result of generation of the modulation signal, the recording position modulation is not conducted in the case of the pixel in the low density portion, or the high density portion, and in a region of characters, the recording position modulation by which the position of small dots of n lines in the objective pixel is moved to the position along the original character and the direction of lines of the line image, is conducted according to the density data of the original adjoining pixel, so that the character and the line image can be reproduced sharply. With regard to the recording position modulation, it is conducted only for black components for preventing image tone change in a halftone region, and for other color component, modulation by means of triangular wave without phase displacement is conducted.

Further, when a phase of the reference wave is shifted in the subsidiary scanning direction successively, a dot corresponding to a halftone dot having a screen angle can be structured. For example, when the screen angle is 45° for a yellow component, 26.6° for a magenta component, −26,6° for a cyan component, and 0° for a black component, uniformity of the color reproduction can be improved, and generation of moire fringes can be prevented.

Especially, when the screen angle for the black component is 0°, the recording position modulation means can be used without any alteration.

The raster scanning circuit 300 is provided with a δ delay circuit 311, a 2δ delay circuit 312, laser drivers 301A to 301C, an index detection circuit which is not shown in the drawings, and a polygonal mirror driver, and the like.

Laser drivers 301A to 301C oscillate a semiconductor laser array 431 having a plurality of (in this case, three, namely n=3) laser emission sections 431A to 431C by the modulation signal from the modulation circuits 260A to 260C, and a signal corresponding to an amount of light beams from the semiconductor laser array 431, is fed back, and the laser drivers 301A to 301C drive the semiconductor laser array 431 so that the light amount can be kept constant.

The index detection circuit detects the surface position of the rotating polygonal mirror 434 which is rotated at a predetermined speed by an index signal outputted from an index sensor 439 and conducts optical scanning by the image density signal modulated by the raster scanning method according to the period of the primary scanning direction. The scanning frequency is 2204.72 Hz, the effective printing width is not less than 297 mm, and the effective exposing width is not less than 306 mm.

The polygonal mirror driver rotates a DC motor at a predetermined speed uniformly, and a rotary polygonal mirror at 16535.4 rpm.

Figure 26:
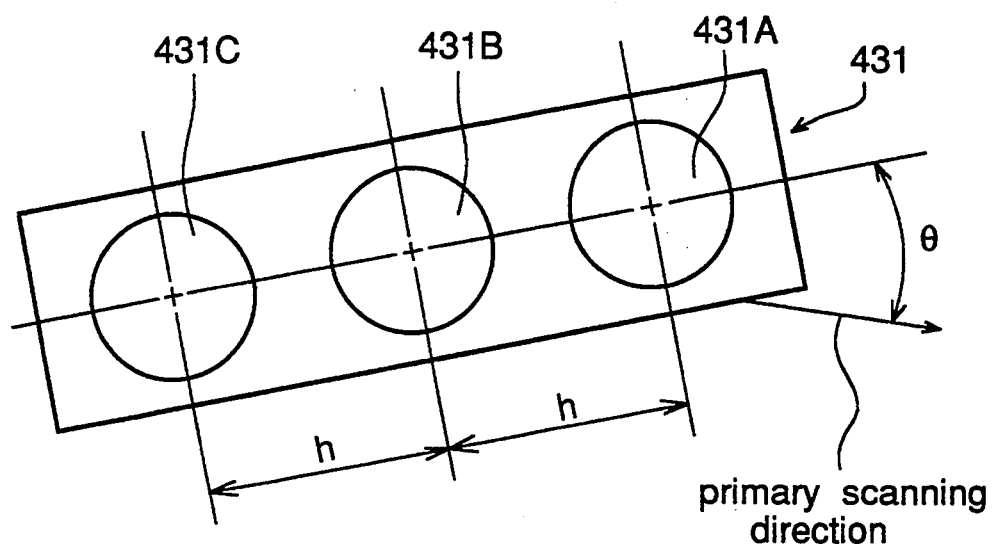
FIG. 26 is a view showing a laser semiconductor array of the example shown in FIG. 4.
Figure 27:
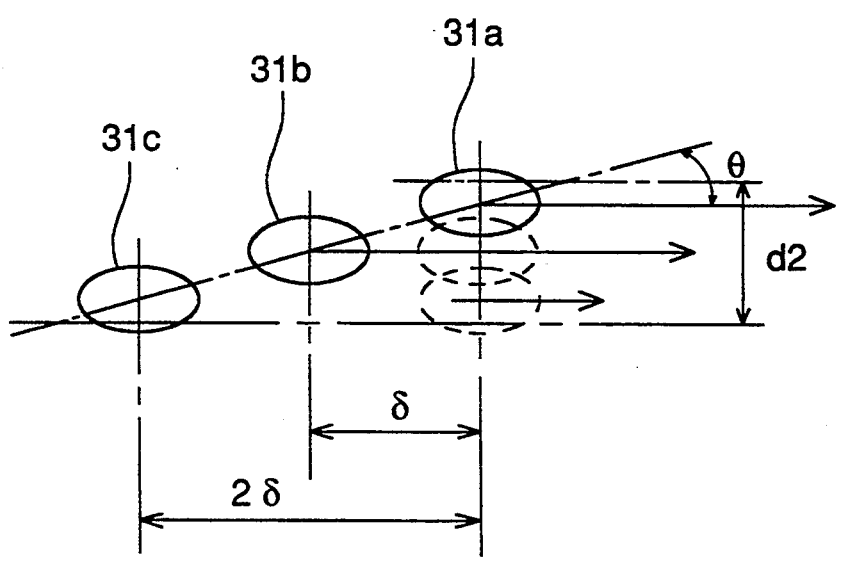
FIG. 27 is a view showing a locus of a laser spot generated by the semiconductor laser array shown in FIG. 26.

As shown in FIG. 26, the semiconductor laser array 431 is used in the manner that three emitting portions 431A to 431C are positioned in the array at regular intervals. Since it is normally difficult that a space d between emitting portions is not more than 0.1 mm, a shaft which passes through the center of emitting portions 431A to 431C is mounted to be parallel with the rotating shaft of the rotary polygonal mirror 434, and to be inclined at a predetermined angle θ with respect to the primary scanning direction as shown in FIG. 26. Due to the aforementioned, laser spots 31a, 31b, 31c of the laser beam by the semiconductor laser array 431 on the photoreceptor 401 can scan upwardly and downward in the manner that they are close to each other, as shown in FIG. 27. However, due to the aforementioned, positions of laser spots 31a, 31b, and 31c in the scanning direction are deviated respectively with respect to the primary scanning direction and 31a is delayed from 31b and 31c by the time difference of δ and 2δ determined by scanning speed. In order to correct the deviation, when the δ delay circuit 311 is inserted between the modulation circuit 260B and the laser driver 301B, and the 2δ delay circuit 312 is inserted between the modulation circuit 260C and the laser driver 301C so that an appropriate amount of time is delayed and the timing is adjusted and laser spots 31a, 31b, and 31c emitted from the semiconductor laser array 431 may be recorded together vertically to the primary scanning direction.

When the RE processing is conducted in the manner that the objective pixel is divided into 2×2 small pixels, the semiconductor laser array having two emitting portions is used.

Figure 31:
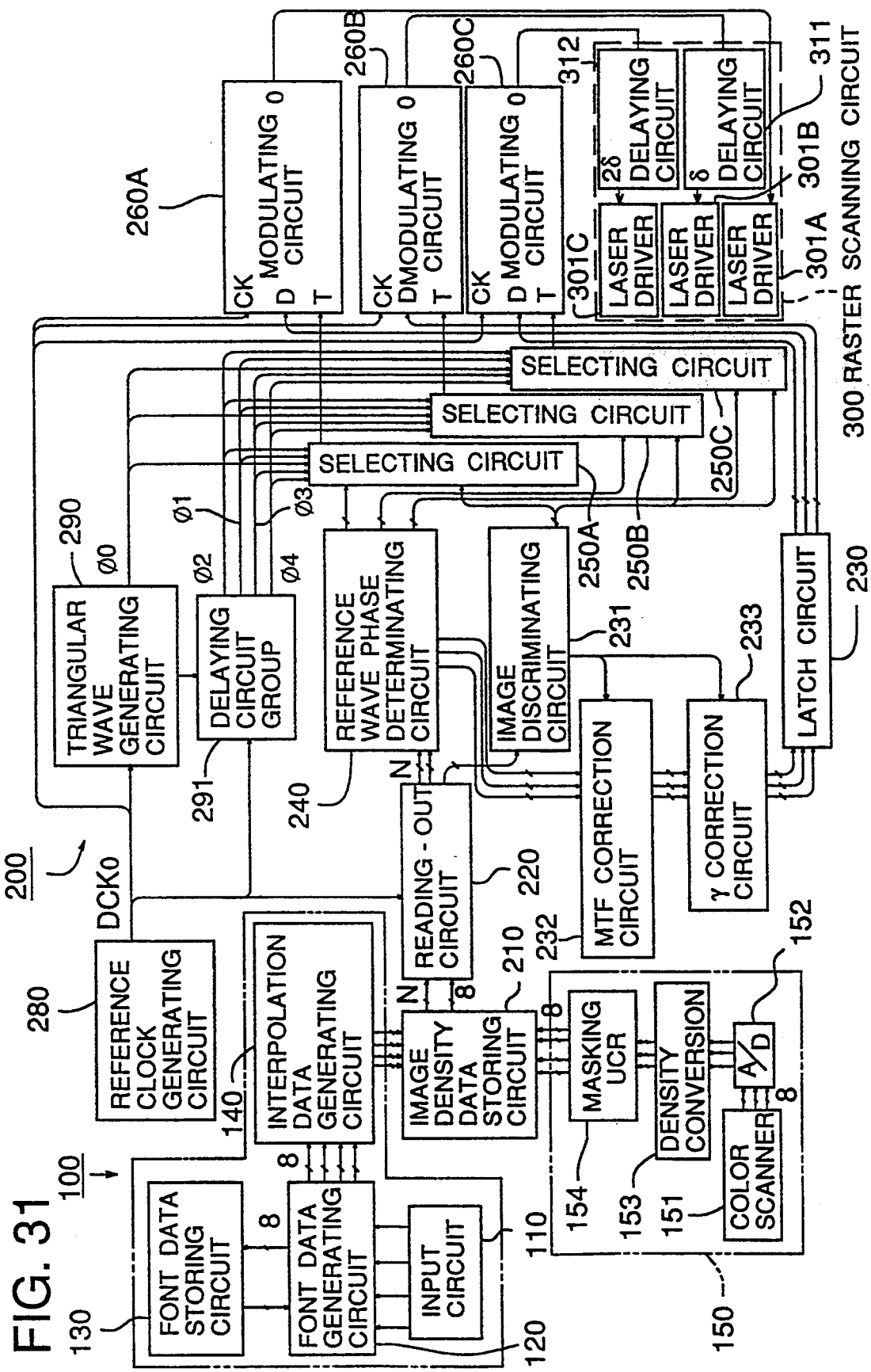
FIG. 31 is a block diagram showing the image processing circuit of another example of the present invention.
Figure 32:
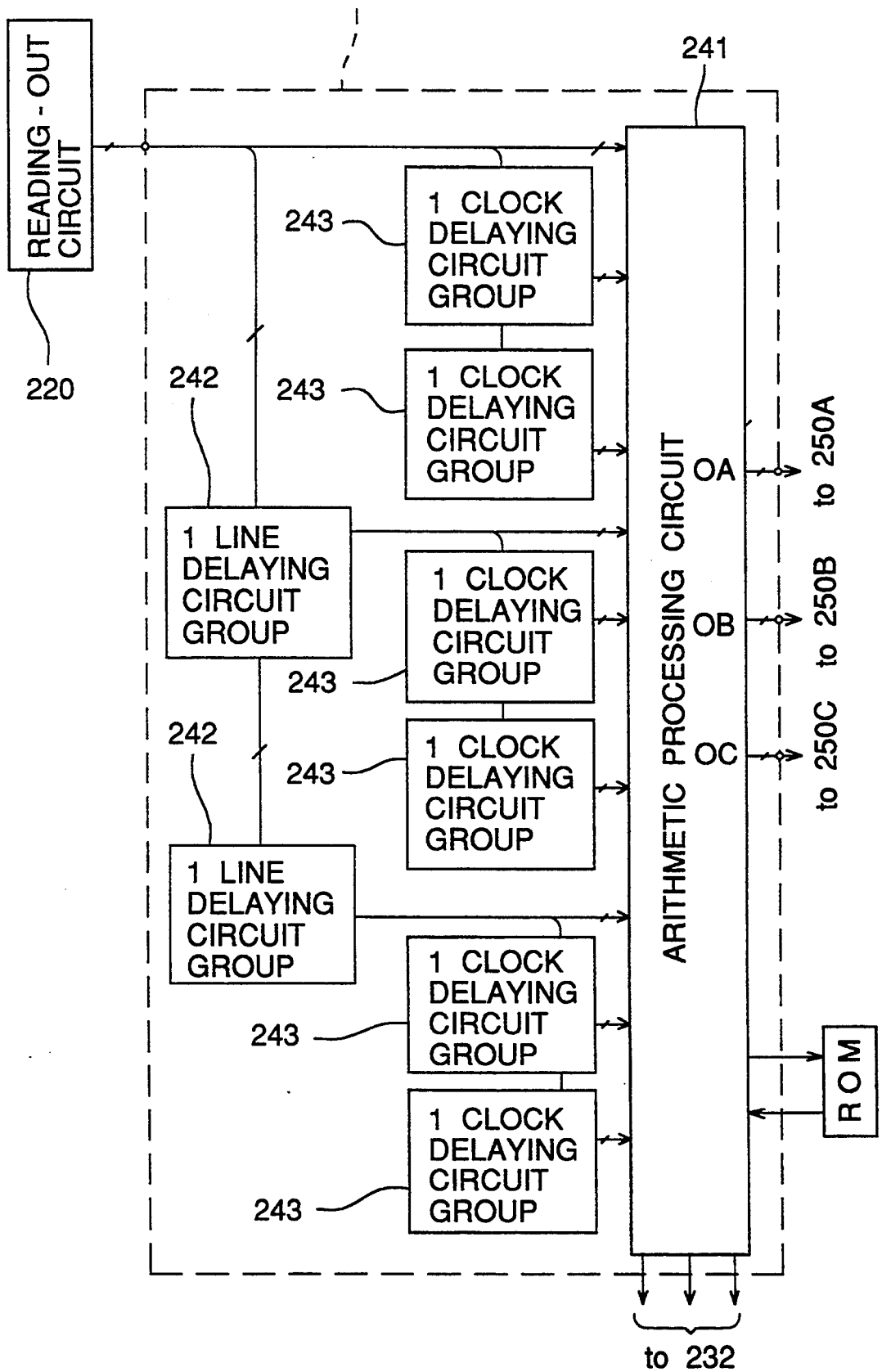
FIG. 32 is a block diagram showing the reference wave phase determination circuit illustrated in FIG. 20.

In the aforementioned embodiments of the present invention, as for the density information in each scanning direction, the average density in the primary scanning direction is regarded as the laser emitting output, and the data outputted from the read-out circuit 220 is used for the image data. However, the following structure can be adopted in which: the average density of each small scanning line obtained by the reference wave phase determination circuit 240, as shown in FIG. 31 and FIG. 32, is used for the density information; and the density data is inputted into the modulation circuits 260A to 260C by each reference wave so that laser drivers 301A to 301C are modulated.

Next, the image forming process of the image forming apparatus 400 shown in FIG. 15, will be explained as follows.

At first, the photoreceptor 401 is charged uniformly by the scorotron charger 402. An electrostatic latent image corresponding to yellow is formed on the drum-like photoreceptor 401 by the following method that: the laser beam modulated by yellow data (8 bit digital density data) read out from the image density data register 210 is emitted through the cylindrical lens 433 and the rotary polygonal mirror 434, the fθ lens 435, the cylindrical lens 436, and the reflection mirror 437. The electrostatic latent image corresponding to yellow is developed by the first developing unit 441, and the extremely sharp dot-like first toner image (yellow toner image) is formed on the photoreceptor 401. The first toner image is not transferred onto a recording sheet, passes under the cleaning device 470 which is withdrawn, and the scorotron charger 402 charges again the surface of the photoreceptor 401.

Next, the electrostatic latent image is formed after the laser beam modulated by magenta data (8 bit digital density data) has been radiated on the photoreceptor 401. The latent image is developed by the second developing unit 442 so that the second toner image (magenta toner image) is formed. In the same way as the above described, the electrostatic latent image by the cyan data is developed by the third developing unit 443 so that the third toner image (cyan toner image) is formed, and a three color toner image, in which three images of different colors are superimposed successively, is formed on the photoreceptor 401. Lastly, the fourth toner image (black toner image) is formed, and four color toner image, in which four images of different colors are superimposed successively, is formed on the photoreceptor 401.

According to the image forming apparatus 400 of the present embodiment, the photoreceptor 401 has excellent high γ characteristics, and even when the toner image is formed in the manner that a plural number of times of charging and exposing processes are conducted repeatedly so that toner images are superimposed, the latent image can be formed stably due to the excellent high γ characteristics. That is, even when the laser beam is radiated on toner images according to the digital signal, a dot-like electrostatic latent image which has no fringe and high sharpness, is formed, and thereby a toner image having high sharpness can be obtained.

These four color toner images are transferred onto a recording sheet fed from a sheet feed device by the unillustrated transfer unit.

The recording sheet on which the transferred toner image is carried, is separated from the photoreceptor 401 by an unillustrated separator, conveyed to an unillustrated fixing roller by a guide and a conveyance belt, thermally fixed and delivered to a sheet delivery tray.

In the present embodiment, as the result of experimenting in which values of factor P for RE processing were changed variously, a fine image could be obtained in the range of 0.1 to 0.9 of P. However, since sharpness of characters is insufficient when P is small, and an edge portion of a line image or a dot is too emphasized when P is large, it was found that the preferable range of P is 0.3 to 0.7. Due to this, when an original document was written by characters and line images, the edge portion could be formed clearly, so that, even in the case of small characters, detail could be reproduced. Further, bad effects did not occur in the low density portion or high density portion. This is due to the reason that this method stops the recording position modulation with respect to these pixels, and makes the factor P=0.

Although, in this method, P can be used as a constant, it is preferable that P is changed, corresponding to the image (in a character region or halftone region). When the P value is defined as $P_1$ for the character region, and the P value is defined as $P_2$ for the halftone region, $P_1 > P_2$ is preferable. That is, when the image exists in the character region, the P value is large, preferably 0.9 to 0.4, and when the image exists in the halftone region, the P value is small, preferably 0.6 to 0.1.

P=0 corresponds to the value in the case where recording position modulation is not conducted.

Further, in the present invention, the ratio of the RE processing can be freely changed even when the specific value of P is used.

Figure 29:
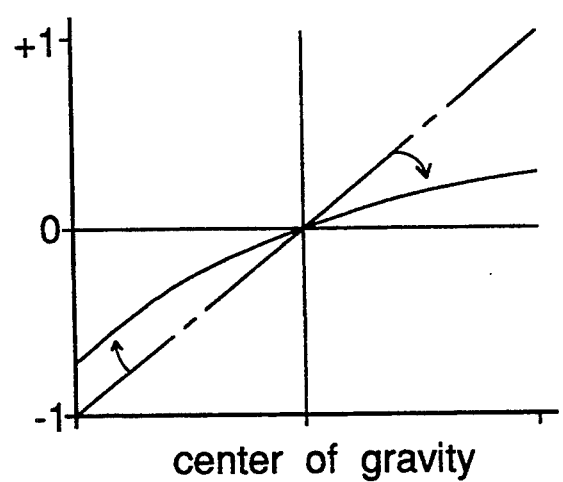
FIG. 29 is a graph showing an example in which a relation between the gravity center of small scanning lines in the primary scanning direction and the recording position is converted.
Figure 30:
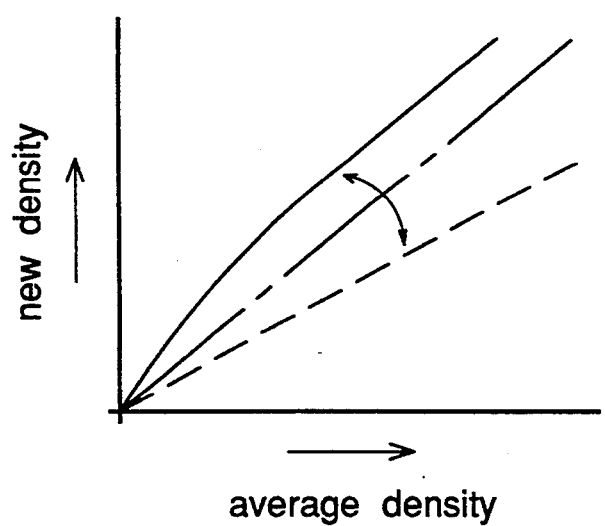
FIG. 30 is a graph showing an example in which average density of small scanning lines in the auxiliary scanning direction is converted.

FIG. 29 is a graph showing an example of the case where the relation between the recording position in the primary scanning direction and the gravity center is converted. FIG. 30 is a graph showing an example of the case where the average density in the subsidiary scanning direction is converted.

In the arithmetic processing circuit 241, it is possible to change the recording position converted in accordance with a conversion expression established in advance as shown in FIG. 29, using a ROM 245 in which the result obtained from the image density data by arithmetic processing is contained, or on which the above result is provided externally.

In the aforementioned flow of the image data, an example of a laser printer which outputs the data having been stored once in the page memory 210 is explained. However, the present invention is not limited to the specific embodiments, but when the image data processing circuit 100 is replaced by the image data processing circuit 150 composed of the color scanner 151, the A/D converter 152, the density converter 153, the masking UCR circuit 154 and the like, and the image density data is inputted into the processing circuit 150 from the scanner and the image is processed in the circuit, the present invention can be adopted to other image forming apparatus such as a copying apparatus and the like.

In the invention, as stated above, the phase of a reference wave is selected from image data subjected to the RE processing wherein a scanning optical system employing a laser spot whose shape on a photoreceptor is an ellipse whose major axis is in parallel with the primary scanning direction is used, a looked pixel included in specific density is divided into small pixels in accordance with density data of the looked pixel, and density of the looked pixel is allocated to each small pixel depending on the distribution of density data of adjoining pixels including the looked pixel, and recording position modulation signals prepared by modulating the density signals of the looked pixel by the reference wave are generated without modulating low density portions and high density portions in terms of recording positions. Thereby, excellent recorded images having high sharpness and no fringe patterns were obtained. In addition, an image discriminating circuit conducts image discrimination, and color image recording is made by means of modulated signals wherein a character region is subjected to recording position modulation for all color components, and a halftone region is subjected to recording position modulation for only achromatic color component (black). Therefore, it is possible to provide an excellent image forming method which causes no change in color tone of color images formed through a scanner, CG or font data and improves sharpness.

It is further possible to enhance an effect by using a high γ photoreceptor. Next, an improved example for reading image density edge portions in the invention will be explained as follows.

With regard to image signals made by a computer as described above or read by a scanner, when an edge portion with high image density interferes with reading pixels, signals in the relevant pixel becomes identical to the medium density in the uniform image. In addition, in the conventional pulse-width-modulation, all it can do is just a coarse presentation because a recording dot is formed at the center of a pixel either in the recording on the edge portion or in the recording on the halftone area.

In the image forming apparatus of the invention, therefore, a plurality of laser beams conduct a recording position modulation that displaces positions of electrostatic latent images of recording dots in the primary scanning direction and sub-scanning direction, and a spot of a laser beam forms a shape of an ellipse whose major axis is in parallel with the primary scanning direction, so that an image with improved resolution may be obtained.

Figure 37:
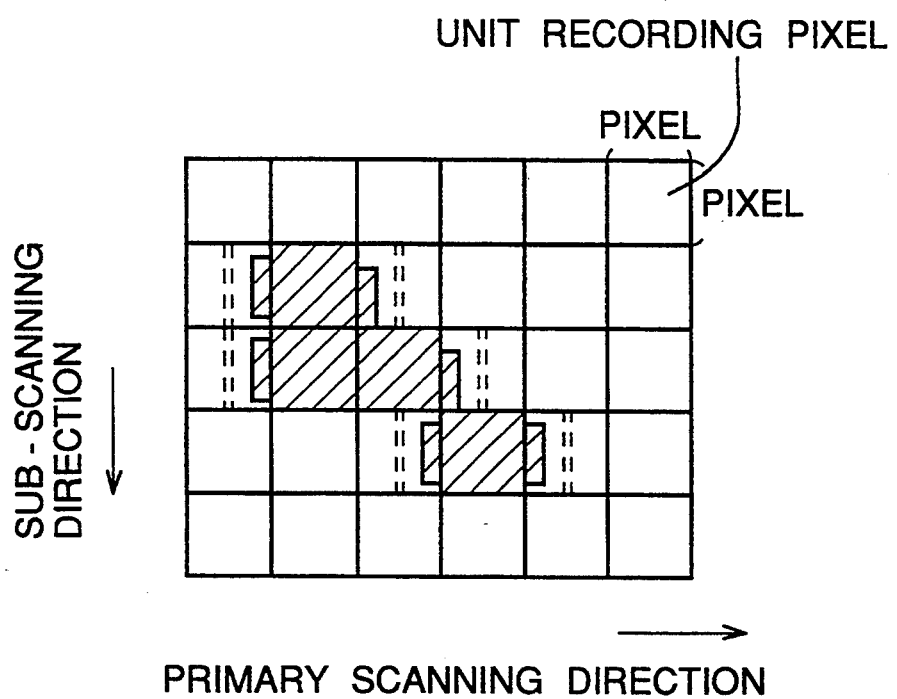
FIG. 37 is a schematic illustration showing a model in which a latent image is formed by the modulation signal of the present invention.

FIG. 37 represents a schematic diagram wherein a latent image is formed by modulated signals from an image processing unit in the present example.

Gradation control is made by changing an area of a toner dot in image forming apparatus 400 of the present example. With regard to image signals prepared by a computer or read by a scanner as stated above, when an edge portion where image density is high interferes a pixel to be read, the signals on the relevant pixel are the same as the medium density on a uniform image. When the same reference wave is used employing neither an all-direction edge detection circuit nor a select circuit, records of edge portions are formed to be isolated at the center of the pixel as shown with dotted lines in FIG. 37. In the image forming apparatus 400 of the present example, therefore, a recording position modulation for displacement in both the primary scanning direction and the sub-scanning direction is conducted so that laser spots may be displaced in all directions on photoreceptor 401 for formation of sot-shaped latent images. Owing to this, it is possible to displace laser spots to edges on photoreceptor 401 for recording and to improve resolution on edge portions of electrostatic latent images.

Figure 34:
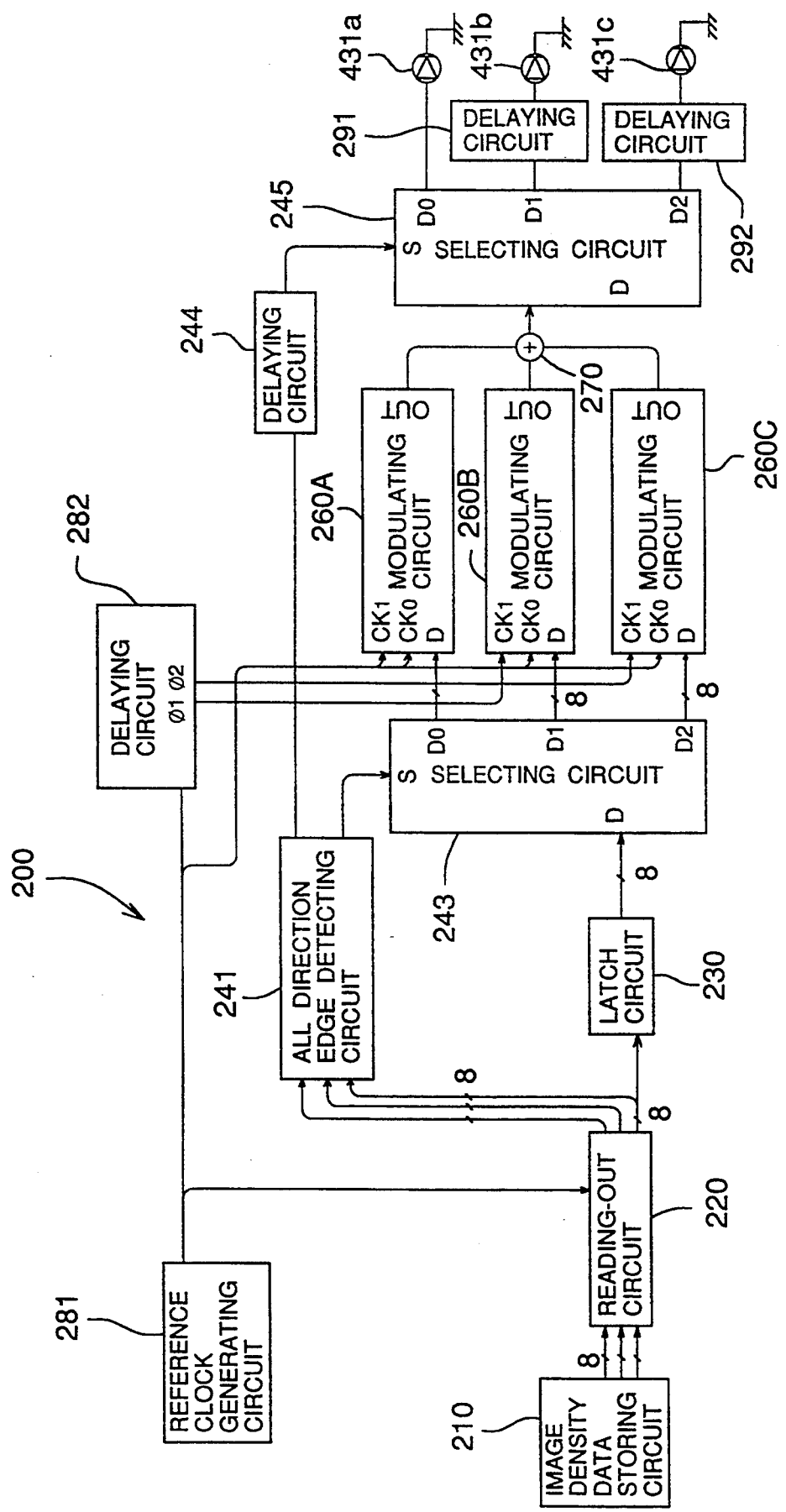
FIG. 34 is a block diagram of the image processing circuit of an example of the image forming apparatus according to the present invention.
Figure 35:
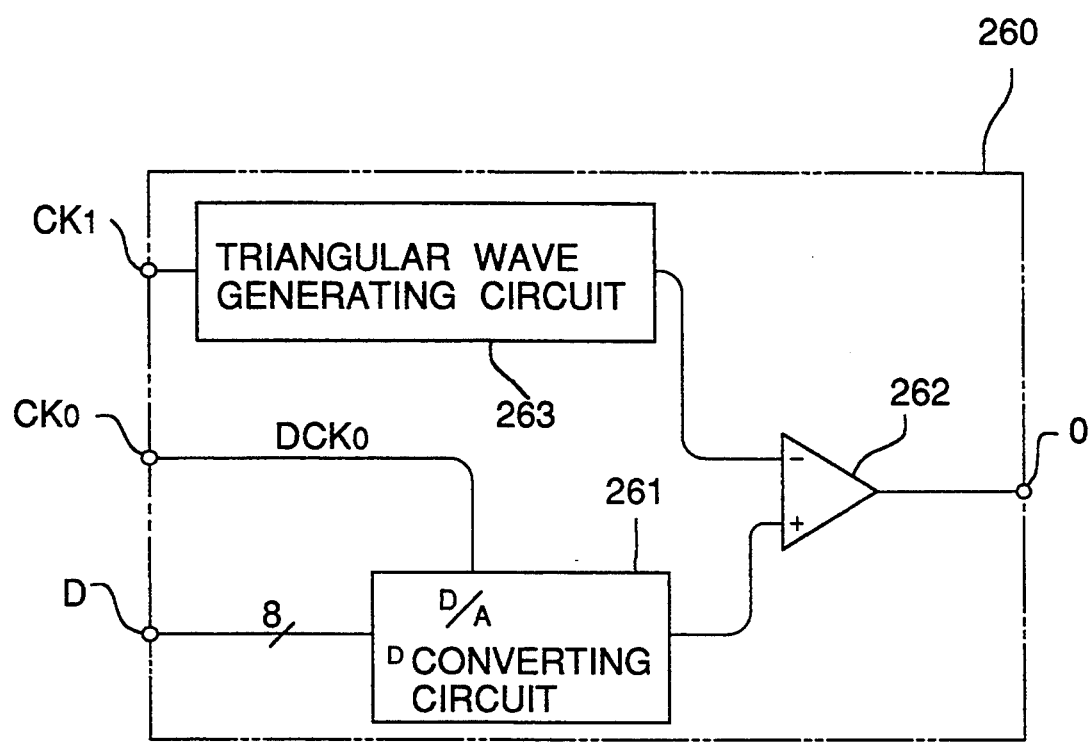
FIG. 35 is a block diagram showing an example of the modulation circuit of the image processing circuit illustrated in FIG. 34.

FIG. 34 is a block diagram showing an example of an image processing circuit used in an image forming method of the invention and FIG. 35 is a block diagram showing a modulation circuit in the present example.

Image processing circuit 200 in the present example is a circuit that drives semiconductor laser array 431 by the use of modulated signals obtained by pulse-width-modulating image density data, and it is provided with a recording position modulating function for detecting a density inclination in density data of pixels corresponding to a plurality of pixels adjoining in all directions such as, for example, vertical, horizontal and oblique directions and displacing laser spots which form images on photoreceptor 401 in the primary scanning and sub-scanning directions, and it is composed of image density data storage circuit 210, reading circuit 220, latch circuit 230, image discriminating circuit 241, select circuits 243 and 245, modulating circuits 260A–260C, composing circuit 270, reference clock generating circuit 280, delay circuits group 282 and delay circuits 244, 291 and 292.

Image density data storage circuit 210 is usually a page memory (hereinafter referred to simply as page memory 210) and is further a RAM (random access memory) that stores with a unit of a page, and it has capacity to store multi-valued image density data corresponding to at least one page (equivalent to one image screen). Further, when it is employed in a color printer, it is required to have a page memory which is enough to store image density signals corresponding to a plurality of colors, such as, for example, yellow, magenta, cyan and black.

The reading circuit 220 reads image density data in the lateral direction, vertical direction and diagonal direction for 3 adjoining scanning lines, for example, synchronizing with reference clock $DCK_0$ with index signals as a trigger, from image density data storage circuit (page memory) 210 to all-direction edge detecting circuit 241, and sends image density data corresponding to the recording central scanning line among the 3 scanning lines to the latch circuit 230.

The latch circuit 230 is a circuit that latches image density data only when the all-direction edge detecting circuit 241 is processing.

The reference clock generating circuit 281 is a pulse-generating circuit and it generates pulse signals with a cycle period identical to that of a pixel clock to send them to reading circuit 220, delay circuits group 282 and modulating circuits 260A–260C. For convenience sake, the clock is called reference clock $DCK_0$.

A plurality of pixel clocks $DCK_1$ and $DCK_2$ each being delayed by $1/n$ cycles in phase from reference clock $DCK_0$ are generated in delay circuits group 282 wherein pixel clock $DCK_1$ delayed by $\frac{1}{3}$ cycles in phase from reference clock $DCK_0$ is outputted from terminal $\phi_1$ to modulation circuit 260B and pixel clock $DCK_2$ delayed by $\frac{2}{3}$ cycles or advanced by $\frac{1}{3}$ cycles in phase from reference clock $DCK_0$ is outputted from terminal $\phi_2$ to modulation circuit 260C.

All-direction edge detection circuit 241 is a circuit wherein image density data of three scanning lines to be inputted in parallel are differentiated in succession among image density data corresponding to a plurality of pixels adjoining in all directions, namely in vertical, horizontal and oblique directions to obtain a difference value stated later, selected signals corresponding to the difference value are read by a built-in memory, and edges in all directions and their directions to be sent to select circuit 243 and select circuit 245 are detected. Namely, the all-direction edge detection circuit 241 detects data corresponding to edges from adjoining image density data of three lines and further detects the directions of the edges. The direction of an edge in this case means a direction wherein the change from low density to high density in image density data exists. Selection signals to select the terminal for outputting image density data depending on the detected direction of the edge are sent to select circuit 243 and selection signals to designate the semiconductor laser to be turned on among semiconductor lasers 431a–431c of semiconductor laser array 431 depending on the detected direction of the edge are sent to select circuit 245. Thus, the recording position modulation for displacing the recording position of a latent image on the edge portion to the higher image density portion is conducted.

When a specific value of a differentiated value is assumed to be $\alpha$ the difference value mentioned above is defined as "+1" when the differentiated value is $\alpha$ or larger than that, and it is defined as "−1" when the differentiated value is $-\alpha$ or lower than that. When image data other than those on edges, namely the differentiated values are in the range from $-\alpha$ to $+\alpha$, the difference value is defined to be "0". When the difference value thus obtained shows $(-1, 0)$ in the primary scanning direction, (0, −1) in the sub-scanning direction, (0, −1) in the oblique direction down to the right, and (0, 0) in the oblique direction down to the left, the position for the displacement of the laser spot corresponding to the above combination is read from the reference table in a ROM. In the present example, the reference table shows (+1, −1) for the inputted data of the above combination. Thus, the all-direction edge detection circuit 241 generates selection signals of (+1, −1) with which the recording position is displaced by $\frac{1}{3}$ cycles in the primary scanning direction and displaced downward in the sub-scanning direction.

On the other hand, when the difference value shows (0, −1) in the primary scanning direction, (0, 0) in the sub-scanning direction, (0, 0) in the oblique direction down to the right, and (0, 0) in the direction toward the right, the selection signals take (−1, 0) which commands the recording position to be displaced by $-\frac{1}{3}$ cycles only in the primary scanning direction.

The select circuit 243 outputs image density data from different output terminals $D_0$–$D_2$ depending on selection signals from all-direction edge detection circuit 241. To be concrete, when the selection signal is "0", image density data are sent from output terminal $D_0$ and image density data for the white background are sent from $D_1$ and $D_2$. When the selection signal is "+1" image density data are sent from output terminal $D_1$ and image density data corresponding to image density on the white background are sent from $D_0$ and $D_2$. When the selection signal is "−1" image density data are sent from output terminal $D_2$ and image density data corresponding to the image density on the white background are sent from $D_0$ and $D_1$.

The modulation circuits 260A–260C are of the same circuit composition as shown in FIG. 35 and each of them is composed of D/A conversion circuit 261, comparator 262 and triangular wave generating circuit 263 that generates triangular waves. In the modulation circuit, image density data sent from select circuit 243 are D/A-converted by D/A converting circuit 261 synchronizing with reference clock $DCK_0$ and are compared with a reference wave that is a triangular wave generated by triangular wave generating circuit 263 for obtaining pulse-width-modulated signals. In all modulation circuits 260A–260C, image density data are D/A-converted by reference clock $DCK_0$ and a phase of each clock to be inputted into triangular wave generating circuit 263 is different. Comparison is made, therefore, with reference triangular wave by means of reference clock $DCK_0$ in modulation circuit 260A, with a triangular wave delayed by $\frac{1}{3}$ cycles in modulation circuit 260B and with a triangular wave advanced by $\frac{1}{3}$ cycles in modulation circuit 260C.

Composing circuit 270 is a circuit that composes modulated signals coming from the modulation circuits 260A–260C mentioned above.

Next, there will be given an explanation of how image processing circuit 200 operates.

Figure 36:
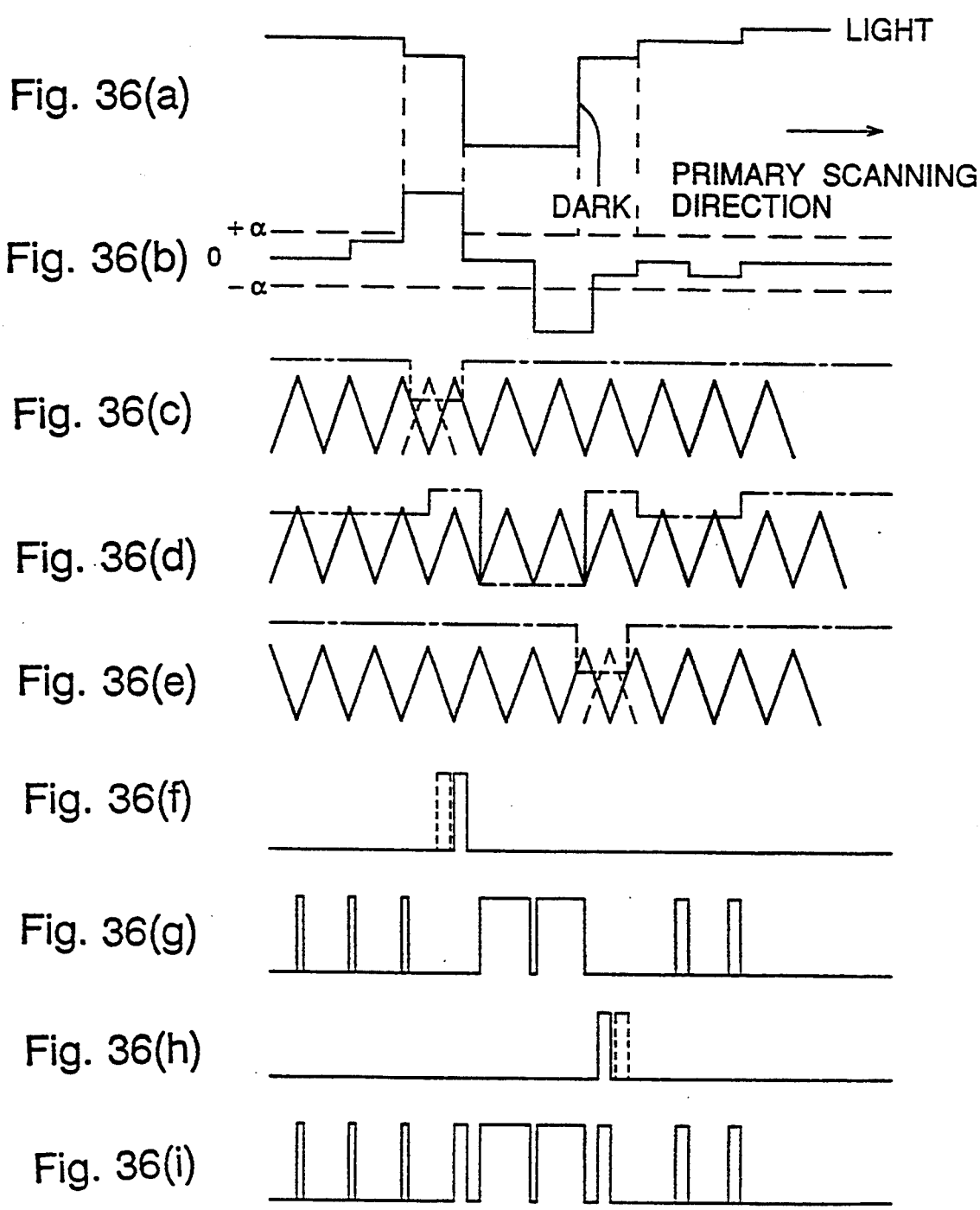
FIGS. 36(a), 36(b), 36(c), 36(d), 36(e), 36(f), 36(g), 36(h) and 36(i) are time charts showing each signal of the image processing circuit of this example.

FIGS. 36 (a)–(i) represent the time charts showing signals at each portion of an image processing circuit in the present example.

In FIG. 36, (a) represents a part of image density data for one scanning line read from page memory 210 based on reference clock $DCK_0$ with an index signal as a trigger and converted to analog values by means of D/A converting circuit 261. These digital image density data for one scanning line are transmitted simultaneously to all-direction edge detection circuit 241 and latch circuit 230 from reading circuit 220. With regard to image density data in the time chart, the higher level side shows lighter density, while the lower level side shows darker density.

FIG. 36 (b) represents the state of edge detection in the primary scanning line in the all-direction edge detection circuit 241 and it indicates differential values in the primary scanning direction. When an absolute value of the differential value exceeds specific value $\alpha$ as stated above, judgment is made to be an edge portion and the direction of the edge is discriminated depending upon whether the differential value is positive or negative. Edge detection in other directions can be done in the same way and recording positions in terms of displacement in the primary scanning direction and sub-scanning direction are determined by ROM table. The output value that is "0" represents continuous image density data on the same level. The output signals in the primary scanning direction are sent to select circuit 243 based on reference clock $DCK_0$.

On the other hand, latch circuit 230 latches signals only for the period of time required for the all-direction edge detection circuit 241 to process, and sends them to select circuit 243.

FIGS. 36 (c)–(e) represent combinations of reference waves to be selected and image density data.

FIG. 36 (c) shows modulation operation of modulation circuit 260B wherein image density data are inputted in modulation circuit 260B only when the output values from the all-direction edge detection circuit 241 are positive, and if the output values from the all-direction edge detection circuit 241 take other values, image density data for a white background are inputted. The reference wave in this case is a triangular wave having a cycle period identical to that produced by clock $DCK_1$ delayed by $\frac{1}{3}$ cycles from the reference clock $DCK_0$. Due to this, output signals from modulation circuit 260B may provide modulation signals which are delayed by $\frac{1}{3}$ cycles as shown in FIG. 36 (f) compared with an occasion of pulse width modulation made by triangular waves (those shown with dotted lines in the figure) based on reference clock $DCK_0$. Modulated signals shown with dotted lines are output signals in the case of modulation made by triangular waves having no delay in phase.

FIG. 36 (d) shows modulation operations in modulation circuit 260A, and image density data for a period when the selected signal from all-direction edge detection circuit 241 is "0" are inputted into the modulation circuit 260A and image density data for a white background are inputted thereinto for other signals. The modulation circuit 260A outputs modulated signals with reference phase shown in (g) and modulated by a triangular wave based on reference clock $DCK_0$.

FIG. 36 (e) shows modulation operations in modulation circuit 260C into which the image density data for a previous pixel are inputted after being processed for a period wherein selected signals from all-direction edge detection circuit 241 show negative values and image density data for a white background are inputted for other signals. The reference wave is a triangular wave based on clock $DCK_2$ that is advanced by $\frac{1}{3}$ cycles. Thereby, the modulation circuit 260C outputs modulated signals having modulated pulse width that is advanced by $\frac{1}{3}$ cycles as shown in (h) after being compared by comparator 262.

FIG. 36 (i) shows modulated signals outputted from composing circuit 270. In the image processing circuit 200 in the present example, as stated above, edges and their directions are detected by all-direction edge detection circuit 241 based on image density data, and modulated signals for a unit of one scanning line whose recording positions in the primary scanning direction at an edge portion are modulated are outputted to select circuit 245.

On the other hand, selected signals from all-direction edge detection circuit 241 are delayed by delay circuit 244 by a period equivalent to processing time in modulation circuits 260a–260c and composing circuit 270, and then are sent to select circuit 245. The select circuit 245 sends, based on selected signals from all-direction edge detection circuit 241, the modulated signals inputted through composing circuit 270 to only one of semiconductor lasers 431a–431c so that the modulated signals may oscillate. Due to the aforementioned, laser spot positions can be displaced toward the center or in the selected sub-scanning direction. This is how recording positions in the sub-scanning direction are modulated.

Figure 33:
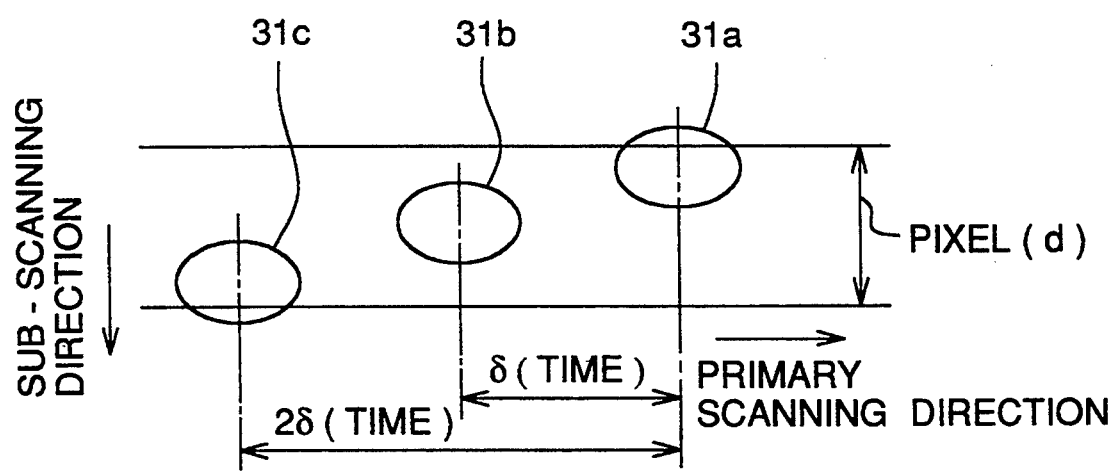

In semiconductor laser array 431 used in the present example, semiconductor lasers 431a–431c which represent three emitting units are arranged at regular intervals to form an array. Since it is usually difficult to make an interval between emitting units to be 0.1 mm or less, the semiconductor lasers 431a–431c are installed so that the axis passing through their centers may be in parallel with the axis of rotation of rotary polygon mirror 434 and may be on the tilt of a certain angle against the primary scanning direction. Owing to this, laser spots 31a, 31b and 31c formed on photoreceptor 401 by laser beams from semiconductor laser array 431 are positioned for scanning so that laser spots 31a and 31c are away from laser spot 31b by about ⅓ d (d represents the width of a pixel in the sub-scanning direction) in thee sub-scanning direction as shown in FIG. 33. However, the positions of laser spots 31a, 31b and 31c in the scanning direction are deviated from others in the scanning direction. In order to correct the deviation, when δ-delay circuit 291 is inserted between select circuit 245 and semiconductor laser 431b and the 2δ-delay circuit 292 is inserted between the select circuit 245 and semiconductor laser 431c, for example, so that an appropriate amount of time is delayed and the timing is adjusted and laser spots 31a, 31b, and 31c formed by the semiconductor laser array 431 may be recorded together on the positions vertically aligned in the primary scanning direction.

FIG. 37 is a schematic diagram showing how latent images are formed by modulated signals from the image processing circuit 200 as that mentioned above. As shown in FIG. 37', dots on the edge portion are moved to the edges in all directions including primary scanning and sub-scanning directions to be recorded. It is possible to enhance the resolution on edge portions by forming recording-position-modulated latent images in the above-mentioned way. Records made by conventional image forming apparatus are shown with dotted lines in FIG. 37.

In the present example, three reference waves whose phases are shifted each other by (0, ±⅓) cycles are used. However, reference waves having phase differences other than the foregoing can also be used. For example, it is possible to use phase differences of (0,±¼) cycles or (0, ±1/6). It is preferable to select reference waves for each use from three or more reference waves depending on image density or edge detection results, on a case by case basis. For example, reference waves having phase differences of (0, ±1/6, ±2/6) cycles may be used. By doing that, it is possible to obtain highly sharp images which are harmonized with density of adjoining images.

In the present example, a reference wave whose cycle is the same as the recording pixels is used. However, it is also possible to use a reference wave whose cycle is two times or four times the recording pixels in number in the primary scanning direction. By doing this, it is possible to prevent beams of the invention from being connected in the lateral direction and thereby to improve reproduction of halftones and obtain images free from streakiness.

In the present invention, as stated above, it is possible to provide an image forming apparatus capable of enhancing resolution of images formed by scanner CG or by font data, by integrating a scanning optical system wherein a shape of a laser spot formed on a photoreceptor is an ellipse whose major axis is in parallel with the primary scanning direction, an all-direction edge detection circuit that detects edges in all directions in an image forming apparatus wherein images are formed on an image forming unit through oscillation of a semiconductor laser array made by modulated signals obtained by modulating image density data with reference wave signals, a modulating means that combines selectively image density data and reference waves having different phases based on the results of the aforementioned detection and changes a size of a recording dot and recording positions in the primary scanning direction depending on the image density, and a recording position modulation means that oscillates one semiconductor laser in a semiconductor array equipped with a plurality of semiconductor lasers and changes recording positions in the sub-scanning direction.

It is further possible to enhance the effect of the invention by scanning the aforementioned one pixel with a plurality of recording beams and by employing a high γ photoreceptor.

What is claimed is:

1. A method of writing an image on a photoreceptor with a laser beam, comprising:

moving the photoreceptor in a given moving direction;

generating a laser beam in accordance with an image signal of a pixel;

exposing the photoreceptor with the laser beam so as to form a beam spot, wherein a size of the beam spot is changed in accordance with an image density level represented by the image signal;

shifting the laser beam in a main scanning direction perpendicular to the moving direction of the photoreceptor so that a line image of pixels is formed in the main scanning direction;

shifting a position of the photoreceptor to be exposed to a next line in a sub-scanning direction with the movement of the photoreceptor;

shaping a laser beam so that the beam spot is shaped as an oval having a major axis lying in the main scanning direction, wherein each pixel has a recording unit area and the oval beam spot formed in the recording unit area satisfies the following relation:

$$0.3 \times (d_2/nd_1) \leq (a/b) \leq 0.9 \times (d_2/nd_1)$$

wherein

"d1" is a first length of the unit area as measured in the main scanning direction;

"d2" is a second length of the unit area as measured in the sub-scanning direction;

"n" is the number of scanning lines in the unit area for values of $n \geq 1$;

"a" is a length of the minor axis of the oval beam spot, and "b" is a length of the major axis of the oval beam spot, and wherein when $n > 1$, the recording unit area is divided into plural sub-pixels so as to be formed with plural oval beam spots by plural scanning lines.

2. The method of claim 1, wherein the recording unit area and the plurality of oval beam spots satisfy another relationship in which:

$$0.4 \times (d_2/nd_1) \leq (a/b) \leq 0.8 \times (d_2/nd_1).$$

3. The method of claim 1, wherein the recording unit area and the plurality of oval beam spots satisfy still another relationships in which:

$$0.3 \times (d_2/n) \leq a \leq 1.5 \times (d_2/n) \text{ and } 0.3d_1 \leq b \leq 1.5d_1.$$

4. The method of claim 1, wherein the image comprises a plurality of pixels, each of said plurality of pixels has a recording unit area; and each of said plurality of oval beam spots is formed in a recording unit area; and wherein the shaping step comprises:

processing image signals of pixels neighboring a target pixel to obtain a density distribution around the target pixel; and then determining a recording position of each oval beam spot on the photoreceptor in accordance with the density distribution around the target pixel.

5. The method of claim 4, wherein the shaping step further comprises:

comparing an image signal with a reference wave signal to generate a modulating image signal; and modulating the laser beam on the basis of the modulating image signal, so that a plurality of types of reference wave signals are provided; and wherein the determining step includes a step of:

selecting one of the reference wave signals in accordance with the density distribution to determine the recording position of each of the oval beam spots.

6. The method of claim 5, wherein the processing step comprises:

determining an average density in the main scanning direction on the photoreceptor from the density distribution; and wherein a selecting step selects one of the reference wave signals in accordance with the determined average density.

7. The method of claim 1, further comprising forming the photoreceptor from a high $\gamma$ type photoreceptor material which has a high sensitivity for a large amount of exposure and a low sensitivity for a small amount of exposure.

8. The method of claim 1, wherein the shaping step includes a step of varying an intensity characteristic of the laser beam in accordance with a density data of a pixel.

9. The method of claim 8, wherein the varying step comprises:

discriminating a type of image as being one of a character image and a halftone image; and regulating the laser beam so that a maximum light amount of the laser beam for a character image is larger than a maximum light amount for a halftone image.

10. The method of claim 8, wherein the varying step comprises:

discriminating a type of image as being one of a character image and a halftone image; and regulating a duty ratio of a control pulse to control an emission time period of the laser beam so that the emission time period of the laser beam for a character image is longer than an emission time period for a halftone image.

11. The method of claim 1, wherein the shaping step includes a step of pulse-width-modulating the laser beam in accordance with a density data of a pixel.

12. The method of claim 11, wherein the shaping step includes:

discriminating a type of image to be one of a character image and a halftone image; and regulating the pulse-width-modulation of the laser beam so that a maximum light amount of the laser beam for a character image is greater than a maximum light amount for a halftone image.

13. The method of claim 11, wherein the shaping step includes:

discriminating a type of image to be one of a character image and a halftone image; and changing a reference clock pulse in accordance with the discriminated type of image so as to provide one of a one pixel width pulse-width-modulation and a two pixel pulse-width-modulation based on the discriminated type of image.

* * * * *